US010233871B2

(12) United States Patent
Huang et al.

(10) Patent No.: US 10,233,871 B2
(45) Date of Patent: Mar. 19, 2019

(54) AIR-ENRICHED GASEOUS FUEL DIRECT INJECTION FOR AN INTERNAL COMBUSTION ENGINE

(71) Applicant: Westport Power Inc., Vancouver (CA)

(72) Inventors: Jian Huang, Richmond (CA); Philip G. Hill, Vancouver (CA); Sandeep Munshi, Delta (CA); Gordon P. McTaggart-Cowan, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 808 days.

(21) Appl. No.: 14/738,837

(22) Filed: Jun. 13, 2015

(65) Prior Publication Data

US 2016/0017845 A1 Jan. 21, 2016

Related U.S. Application Data

(63) Continuation of application No. PCT/CA2013/050975, filed on Dec. 17, 2013.

(30) Foreign Application Priority Data

Dec. 17, 2012 (CA) .................................... 27998870

(51) Int. Cl.
*F02B 43/00* (2006.01)
*F02M 21/02* (2006.01)
(Continued)

(52) U.S. Cl.
CPC ......... *F02M 21/0245* (2013.01); *F02B 29/04* (2013.01); *F02B 33/44* (2013.01);
(Continued)

(58) Field of Classification Search
CPC .. F02M 69/08; F02M 21/0275; F02M 31/135; Y02T 10/121
(Continued)

(56) References Cited

U.S. PATENT DOCUMENTS

| 4,112,875 A | 9/1978 | Laumann et al. |
| 4,413,781 A | 11/1983 | Iwata |

(Continued)

FOREIGN PATENT DOCUMENTS

| EP | 0121028 A1 | 10/1984 |
| EP | 1431564 B1 | 12/2003 |

(Continued)

OTHER PUBLICATIONS

International Search Report of the International Searching Authority dated Feb. 11, 2014, in connection with International Application No. PCT/CA2013/050975.

(Continued)

*Primary Examiner* — Marguerite McMahon
*Assistant Examiner* — James Kim
(74) *Attorney, Agent, or Firm* — Carie C. Mager; C. Larry Kyle

(57) ABSTRACT

A method for introducing a gaseous fuel into a combustion chamber of an internal combustion engine includes forming a non-ignitable mixture of the gaseous fuel and a gas including oxygen in a predefined mixture mass ratio within a predetermined range of tolerance having a pressure suitable for directly introducing the non-ignitable mixture into the combustion chamber during at least the compression stroke; and introducing the non-ignitable mixture directly into the combustion chamber.

32 Claims, 16 Drawing Sheets

(51) Int. Cl.

| | | |
|---|---|---|
| *F02M 67/02* | (2006.01) | |
| *F02B 29/04* | (2006.01) | |
| *F02B 33/44* | (2006.01) | |
| *F02B 37/04* | (2006.01) | |
| *F02B 39/04* | (2006.01) | |
| *F02B 43/12* | (2006.01) | |
| *F02B 63/04* | (2006.01) | |
| *F02D 41/00* | (2006.01) | |
| *F02D 41/22* | (2006.01) | |
| *F02D 41/38* | (2006.01) | |
| *F02M 21/04* | (2006.01) | |
| *H02K 7/18* | (2006.01) | |
| *F02B 43/10* | (2006.01) | |
| *F02B 47/08* | (2006.01) | |

(52) U.S. Cl.
CPC .............. *F02B 37/04* (2013.01); *F02B 39/04* (2013.01); *F02B 43/12* (2013.01); *F02B 63/04* (2013.01); *F02D 41/0027* (2013.01); *F02D 41/22* (2013.01); *F02D 41/38* (2013.01); *F02M 21/0209* (2013.01); *F02M 21/0218* (2013.01); *F02M 21/0221* (2013.01); *F02M 21/0275* (2013.01); *F02M 21/0287* (2013.01); *F02M 21/04* (2013.01); *F02M 67/02* (2013.01); *H02K 7/1815* (2013.01); *H02K 7/1823* (2013.01); *F02B 43/10* (2013.01); *F02B 47/08* (2013.01); *F02D 2041/224* (2013.01); *F02D 2041/389* (2013.01); *Y02T 10/32* (2013.01)

(58) Field of Classification Search
USPC .................. 123/1 A, 531, 532, 533, 534
See application file for complete search history.

(56) References Cited

U.S. PATENT DOCUMENTS

| | | | |
|---|---|---|---|
| 4,899,714 A | | 2/1990 | Schechter et al. |
| 5,025,769 A | | 6/1991 | Plohberger et al. |
| 5,048,489 A | | 9/1991 | Fischer et al. |
| 5,060,609 A | * | 10/1991 | Merritt .................... F02B 19/04 123/256 |
| 5,269,281 A | * | 12/1993 | Hafner ............... F02M 51/0678 123/531 |
| 5,390,647 A | | 2/1995 | Schechter |
| 5,622,155 A | | 4/1997 | Ellwood et al. |
| 5,647,336 A | | 7/1997 | Piock et al. |
| 5,666,928 A | | 9/1997 | Ma |
| 5,730,369 A | | 3/1998 | De Nagel et al. |
| 6,305,363 B1 | | 10/2001 | Klomp |
| 6,397,825 B1 | | 6/2002 | Klomp |
| 6,484,673 B1 | | 11/2002 | Davis et al. |
| 6,505,613 B1 | | 1/2003 | Albertson |
| 6,899,089 B2 | | 5/2005 | Shiraishi et al. |
| 6,955,161 B2 | | 10/2005 | Suzuki et al. |
| 6,959,699 B2 | * | 11/2005 | Shinogle ............. F02M 47/027 123/531 |
| 7,370,643 B2 | | 5/2008 | Hanawa |
| 7,954,472 B1 | * | 6/2011 | Sturman ................ F02D 13/02 123/299 |
| 2004/0007217 A1 | * | 1/2004 | Poola ...................... F02D 21/10 123/533 |
| 2004/0244368 A1 | | 12/2004 | Yang et al. |
| 2005/0011501 A1 | | 1/2005 | Shetley |
| 2006/0063046 A1 | | 3/2006 | Hu et al. |
| 2010/0229830 A1 | | 9/2010 | Ohmori |

FOREIGN PATENT DOCUMENTS

| | | |
|---|---|---|
| WO | 0186128 A2 | 11/2001 |
| WO | 2009033005 A2 | 3/2009 |
| WO | 2009103097 A1 | 8/2009 |
| WO | 2011000042 A1 | 1/2011 |
| WO | 2011015329 A1 | 2/2011 |
| WO | 2012036909 A2 | 3/2012 |

OTHER PUBLICATIONS

International Preliminary Report on Patentability dated Jun. 23, 2015, in connection with International Application No. PCT/CA2013/050975.
Canadian Office Action dated Mar. 14, 2013, in connection with the priority Canadian Patent Application No. 2,798,870.
Canadian Office Action dated Jul. 22, 2013, in connection with the priority Canadian Patent Application No. 2,798,870.
European Office Communication under Rule 71(3) EPC dated Apr. 19, 2018, in connection with allowance in corresponding EP filed application.
Supplementary European Search Report dated Aug. 23, 2016, in connection with the corresponding European Patent Application No. 13864621.1.

* cited by examiner

US 10,233,871 B2

AIR-ENRICHED GASEOUS FUEL DIRECT INJECTION FOR AN INTERNAL COMBUSTION ENGINE

CROSS-REFERENCE TO RELATED APPLICATIONS

This application is a continuation of International Application No. PCT/CA2013/050975 having a filing date of Dec. 17, 2013, entitled "Air-Enriched Gaseous Fuel Direct Injection for an Internal Combustion Engine", which claimed priority benefits from Canadian patent application No. 2,798,870 filed on Dec. 17, 2012. The PCT/CA2013/050975 international application is hereby incorporated by reference in its entirety.

FIELD OF THE INVENTION

The present application relates to a technique of enriching a supply of gaseous fuel with a gas comprising oxygen prior to introduction into a combustion chamber of an internal combustion engine.

BACKGROUND OF THE INVENTION

Aftertreatment systems in current direct-injection natural gas engines are required to meet emission levels of the most stringent regulations. Due to the nature of the combustion process across the engine operating range, emission levels of particulate matter (PM), nitrogen oxides (NOx) and unburned hydrocarbons (UHC) are above regulated levels unless aftertreatment systems are employed. These aftertreatment systems can include particulate filters, oxidation catalysts and reduction catalysts. It is preferable to reduce the dependency on these aftertreatment systems to meet emission regulations, and ideally to eliminate their requirement, by improving the in-cylinder combustion process of the engine.

Various techniques have been studied and employed by the industry to improve the "quality" of in-cylinder combustion by enhancing the mixing between fuel and a gas comprising oxygen, such as air. As used herein the term 'air' is used interchangeably with the phrase 'gas comprising oxygen'. It is understood in its broadest sense the gas comprising oxygen can be gases other than or in addition to air. Mixing techniques widely employed include using higher injection pressure, optimizing charge air motion such as swirl and tumble, optimizing injector nozzle geometry and combustion chamber geometry, and using multiple pulses for fuel injection.

Increasing fuel injection pressure is one of the most effective methods for improving fuel-air mixing for diesel engines. However its application in natural gas engines has some severe obstacles. First, a gaseous fuel system with higher pressure rating requires special design and material that significantly increases the fuel system cost while reducing the reliability or lifetime of the components. Secondly, higher injection pressure that is suitable for high load conditions may not be suitable for lower load conditions (an issue with turn down ratio), and thus this puts more pressure on injector/fuel system design to cover a wide range of operating pressures for different load conditions. Finally, the mixing process of gaseous fuel is somewhat different from that for a liquid fuel. In particular, gaseous fuel does not have the atomization phase which entrains air to the center of the fuel jets. As a result, the effect of higher injection pressure on improving fuel/air mixing during the spray breakup and atomization process does not apply to gaseous fuel jets.

Improving mixing through charge air motion is effective for certain engine modes but not for others. Since little control can be applied to change the charge air motion once the engine design is fixed, optimization at different engine operating points is not feasible. As an additional drawback, since charge air motion mainly affects the bulk motion of the charge, its effectiveness on local mixing is limited.

Similar to charge air motion, injection nozzle and combustion chamber geometry has a different impact on the combustion process under different operating conditions. While optimization can be achieved under certain engine operating points, a global optimization over the engine map is difficult.

Multiple injection pulses have been proven to be effective in diesel engines for PM reduction. Its application is, however, limited by the response time of the injector (controller and driver), total injection duration and injector dynamics. Its effectiveness on gaseous fuelled engines has not yet been proven.

An important issue none of the above techniques is able to fully address is transient behavior of the engine. In a transient state, the engine can shift from low load to high load operation in a short duration. The amount of fuel injected per cycle increases rapidly to provide increased torque that matches the requirement of increased load. The air handling system usually lags the fuel system during transient. As a result, the engine experiences temporary "starvation" of oxidant, or in technique term, an increase of equivalence ratio which leads to elevated levels of PM and carbon monoxide (CO) in the exhaust.

Certain air-assisted liquid fuel injection techniques are known. Pressurized air is employed as a high pressure source for injecting liquid fuel during the injection event. The pressure of air defines the injection pressure, and air supply cannot be turned off since it is required for fuel injection. The liquid fuel is mixed with compressed air in a fuel injector, since it is not practical to mix liquid fuel and air further upstream from the injector. The liquid fuel and air do not form a homogenous mixture prior to injection. In air-assisted injection, air is used as a driver to drive the liquid fuel into the cylinder and help atomization of the fuel. There is effectively no "mixing" between air and the liquid fuel prior to injection.

The state of the art is lacking in techniques for improving combustion quality of gaseous fuelled, direct-injection internal combustion engines throughout the engine map and during transient conditions to decrease emission levels whereby dependency on aftertreatment systems is reduced and ideally eliminated. The present method and apparatus provide a technique for improving the quality of the combustion process in a gaseous fuelled, direct-injection internal combustion engine.

SUMMARY OF THE INVENTION

An improved method for introducing a gaseous fuel into a combustion chamber of an internal combustion engine is disclosed, comprising forming a non-ignitable mixture of the gaseous fuel and a gas comprising oxygen having a pressure suitable for directly introducing the non-ignitable mixture into the combustion chamber during at least the compression stroke; and introducing the non-ignitable mixture directly into the combustion chamber. The non-ignitable mixture comprises a mixture mass ratio less than the mass ratio at the upper flammability limit of the gaseous fuel in the gas comprising oxygen. When the gaseous fuel comprises methane and the gas comprising oxygen is air, the mixture mass ratio (mass of gas comprising oxygen:mass of gaseous fuel) can be between 0:1 and 8.8:1, more preferably the mixture mass ratio is between 0:1 and 2:1, and most preferable the mixture mass ratio is between 0.25:1 and 1:1. The non-ignitable mixture forms a jet in the combustion chamber having a controlled equivalence ratio within and around the jet. The mixture mass ratio between the gaseous fuel and the gas comprising oxygen in the non-ignitable mixture can be adjusted as a function of engine operating conditions. The gas comprising oxygen can be air. The gaseous fuel can be at least one of natural gas, ethane, methane, propane, biogas, landfill gas, dimethyl ether, hydrogen and mixtures thereof.

The method further comprises pressurizing the gaseous fuel as a function of engine operating conditions; compressing the gas comprising oxygen; and mixing the pressurized gaseous fuel and the compressed gas comprising oxygen. The gas comprising oxygen can be stored in an accumulator or piping after it is compressed. The pressure of the gas comprising oxygen can be less than the pressure of the gaseous fuel when mixing, equal to the pressure of the gaseous fuel within a predetermined range of tolerance when mixing, or greater than the pressure of the gaseous fuel when mixing. The mixing can occur inside a fuel injector or upstream of the fuel injector. The bias pressure between the gaseous fuel and the gas comprising oxygen can be regulated and adjusted as a function of engine operating conditions. During transient engine operating conditions the bias pressure can also be adjusted. The method further comprises metering the gas comprising oxygen into the non-ignitable mixture as a function of a differential pressure across a control valve when mixing.

Compressing the gas comprising oxygen comprises at least one of employing energy in exhaust gases of the internal combustion engine; employing energy available in momentum of a vehicle propelled by the internal combustion engine; employing a power take-off of the internal combustion engine; employing a compression stroke of a cylinder in the internal combustion engine; employing a hydraulically driven compressor; and employing an electrical compressor. There can be more than one stage of compression for the gas comprising oxygen, and the gas comprising oxygen can be cooled between stages.

Gaseous fuel pressure before mixing can equal the pressure of the non-ignitable mixture to within a predetermined range of tolerance and a pressure of the gas comprising oxygen before mixing can be less than the pressure of the non-ignitable mixture. Mixing can comprise introducing the gas comprising oxygen into a mixing-compressing apparatus; introducing the gaseous fuel into the mixing-compressing apparatus after the gas comprising oxygen; and compressing the non-ignitable mixture.

An improved apparatus for introducing a gaseous fuel into a combustion chamber of an internal combustion engine comprises a supply of the gaseous fuel; a supply of a gas comprising oxygen; a mixture forming apparatus for forming a non-ignitable mixture between the gaseous fuel and the gas comprising oxygen; and an injection valve for directly introducing the non-ignitable mixture into a charge in the combustion chamber. The mixture forming apparatus can comprise a mixing apparatus for mixing the gas comprising oxygen received from the gas comprising oxygen supply and the gaseous fuel received from the gaseous fuel supply; and a compressing apparatus for compressing the non-ignitable mixture.

Alternatively, the mixture forming apparatus comprises a compressing apparatus for compressing the gas comprising oxygen received from the gas comprising oxygen supply; a pumping apparatus for pumping the gaseous fuel received from the gaseous fuel supply; and a mixing apparatus for mixing the gas comprising oxygen received from the compressing apparatus and the gaseous fuel received from the pumping apparatus. A pressure regulator upstream of the mixing apparatus regulates the bias pressure between the gaseous fuel and the gas comprising oxygen. The mixing apparatus and the injection valve can be integrated in a fuel injector. The compressing apparatus can comprise a first compressor for pressurizing the gas comprising oxygen; and a first storage for storing the gas comprising oxygen received from the first compressor. The first compressor can be driven by a power take-off from the internal combustion engine; by an electric motor powered from an electric generator driven by the internal combustion engine; by a turbine driven from exhaust gases of the internal combustion engine. When the gas comprising oxygen is air, the first compressor can comprise an engine brake of the internal combustion engine, whereby at least a portion of air compressed by the engine brake is stored in the first storage. The apparatus can further comprise a second compressor for compressing the gas comprising oxygen from the first storage; and a second storage for storing the gas comprising oxygen received from the second compressor. The second compressor can be driven by another electric motor powered by the electric generator, or by a power take-off of the internal combustion engine.

The first compressor can comprise a cylinder and a piston of the internal combustion engine that is employed as a first stage compression. In this embodiment, the apparatus further comprises an electronic controller; a check valve between the cylinder and the first storage operable to deliver a portion of air compressed by the piston in the cylinder during a compression stroke; and a control valve between the second storage and the mixing apparatus and operably connected with the electronic controller; whereby the electronic controller commands the control valve to meter a predetermined amount of the gas comprising oxygen into the mixing apparatus. A first pressure sensor provides a first pressure signal representative of gas comprising oxygen pressure upstream of the control valve; and a second pressure sensor provides a second pressure signal representative of gas comprising oxygen pressure downstream from the control valve. The electronic controller receives the first and second pressure signals and commands the control valve as a function of the first and second pressure signals and gaseous fuel pressure upstream of the mixing apparatus. The gaseous fuel pressure can be determined by one of an entry in an engine map and a third pressure sensor.

DETAILED DESCRIPTION OF PREFERRED EMBODIMENT(S)

The embodiments herein disclose forming a non-ignitable mixture of a gas comprising oxygen (such as air) and gaseous fuel and directly introducing the non-ignitable mixture into one or more combustion chambers of an internal combustion engine, or into pre-chambers before introducing into the combustion chambers. Combustion efficiency is increased and emissions are reduced when the non-ignitable mixture is introduced into the combustion chambers compared to when only the gaseous fuel is introduced. A mass ratio between the gas comprising oxygen and the gaseous fuel in the non-ignitable mixture is less than the upper flammability limit (UFL) mass ratio. When the gas comprising oxygen is air and the gaseous fuel is methane, the mass ratio (mass of gas comprising oxygen:mass of gaseous fuel) is in the range of 0:1 (0%) and 8.8:1 (880%) under standard temperature and pressure conditions. The mass ratio of 8.8:1 corresponds to an ignitable mixture where the mass of air is 89.8% of the total mass of the ignitable mixture and the mass of methane is 10.2% of the total mass (89.8/10.2~8.8). In the context of this application standard temperature and pressure are 20 degrees Celsius and 1 atmosphere. More preferably, the mass ratio is in the range of 0:1 (0%) to 2:1 (200%), and most preferably the mass ratio is in the range of 0.25:1 (25%) to 1:1 (100%). The ranges are similar for natural gas, whose largest constituent is methane, and vary according to the concentrations of the individual constituents in the natural gas. For non-ignitable mixtures formed with other gases comprising oxygen and/or other gaseous fuels, the range of mass ratios will vary according to respective upper flammability limits. Generally, the preferred maximum mass ratio is less than the maximum allowable mass ratio (the mass ratio at the UFL) of the non-ignitable mixture for a variety of reasons. The preferred maximum mass ratio is less than the mass ratio at the UFL by a safety factor. The preferred maximum mass ratio for the non-ignitable mixture is that mass ratio where for larger mass ratios the improvement in combustion efficiency is offset by the work required to compress the extra amount of gas comprising oxygen required to achieve the larger mass ratio. The preferred maximum mass ratio for the non-ignitable mixture is that mass ratio where for larger mass ratios the duration of injecting the non-ignitable mixture into the combustion chamber extends the duration of heat release sufficiently to cause excessive reductions in thermal efficiency.

Figure 1:
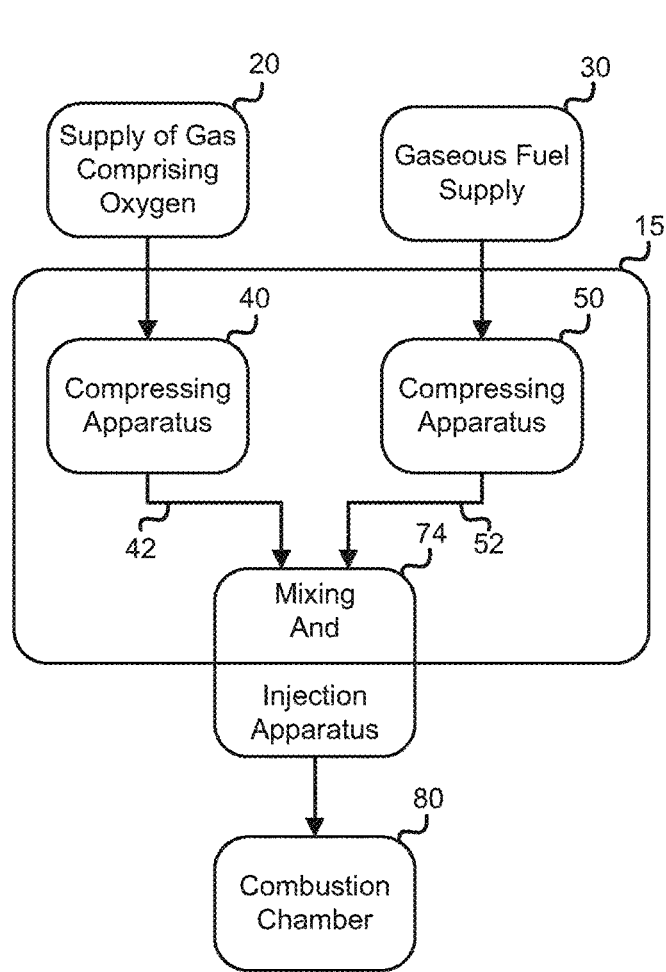
FIG. 1 is a schematic view of a direct injection apparatus for an internal combustion engine for enriching gaseous fuel with a gas comprising oxygen according to a first embodiment.

FIG. 1 shows direct injection apparatus 10 for an internal combustion engine comprising combustion chamber 80 according to a first embodiment. Direct injection apparatus 10 mixes gaseous fuel with a gas comprising oxygen, such as air, and introduces the non-ignitable mixture directly to combustion chamber 80. As used herein a gaseous fuel is defined as a fuel that is in a gaseous phase at standard temperature and pressure. Apparatus 10 comprises air supply 20 and gaseous fuel supply 30. Both supply 20 and 30 provide a low pressure supply of respective fluids. Mixture forming apparatus 15 forms a non-ignitable mixture of gaseous fuel and air in a predefined mixture mass ratio within a predetermined range of tolerance. The predefined mixture mass ratio, which could be defined as an equivalence ratio, can be adjusted as a function of engine operating conditions. Compressing apparatus 40 increases the pressure of air and compressing apparatus 50 increases the pressure of gaseous fuel to pressures suitable for mixing. Both apparatus 40 and 50 can comprise accumulators to store respective pressurized fluids, or such fluids can be stored in piping 42 and 52 respectively. Mixing and injection apparatus 74 mixes air from piping 42 with gaseous fuel from piping 52 and directly introduces the non-ignitable mixture into combustion chamber 80. In a preferred embodiment the non-ignitable mixture is introduced into a charge in combustion chamber 80 after an intake valve closes. The pressure of air in piping 42 can be less than, equal to within a predetermined range, or greater than the pressure of gaseous fuel in piping 52, and such relative pressure between air and gaseous fuel in the piping is dependent upon the manner of mixing in apparatus 74. Conventional mixing techniques can be employed as is known to those familiar with this technology. Apparatus 74 can regulate a bias pressure between air in piping 42 and gaseous fuel in piping 52 such that the predefined equivalence ratio is achieved when mixing. An accumulator can be employed in apparatus 74 for storing the gaseous-fuel/air mixture.

Figure 2:
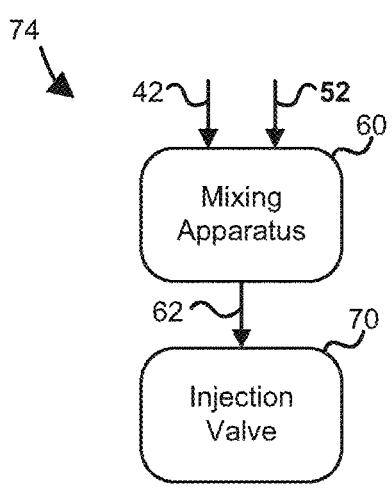
FIG. 2 is a schematic view of a mixing and injection apparatus of the direct injection apparatus of FIG. 1 according to a first embodiment.

With reference to FIG. 2, in one embodiment apparatus 74 comprises mixing apparatus 60 and injection valve 70. The pressure of the gaseous-fuel/air mixture in piping 62 can be regulated by apparatus 60 according to known techniques. Injection valve 70 introduces the non-ignitable mixture in piping 62 into combustion chamber 80 where it forms a jet having the predefined equivalence ratio.

Figure 3:
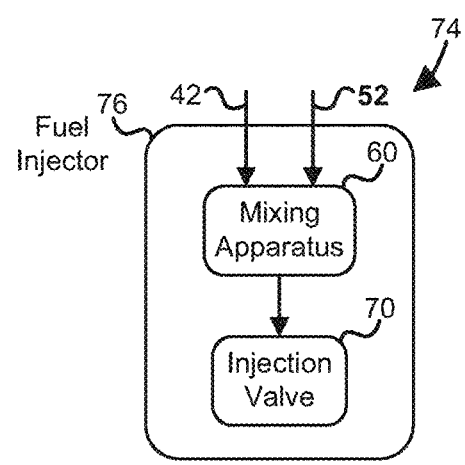
FIG. 3 is a schematic view of a mixing and injection apparatus of the direct injection apparatus of FIG. 1 according to a second embodiment.

With reference to FIG. 3, another embodiment of apparatus 74 comprises component 76, such as a fuel injector, that integrates mixing apparatus 60 and injection valve 70. Pressurized gaseous fuel from piping 52 and compressed air from piping 42 are mixed in mixing apparatus 74. The amount of air injected per cycle into combustion chamber 80 can be controlled by a dedicated actuator and valve inside mixing apparatus 60, which allows for increased precision in mixing ratios between gaseous fuel and air.

Figure 4:
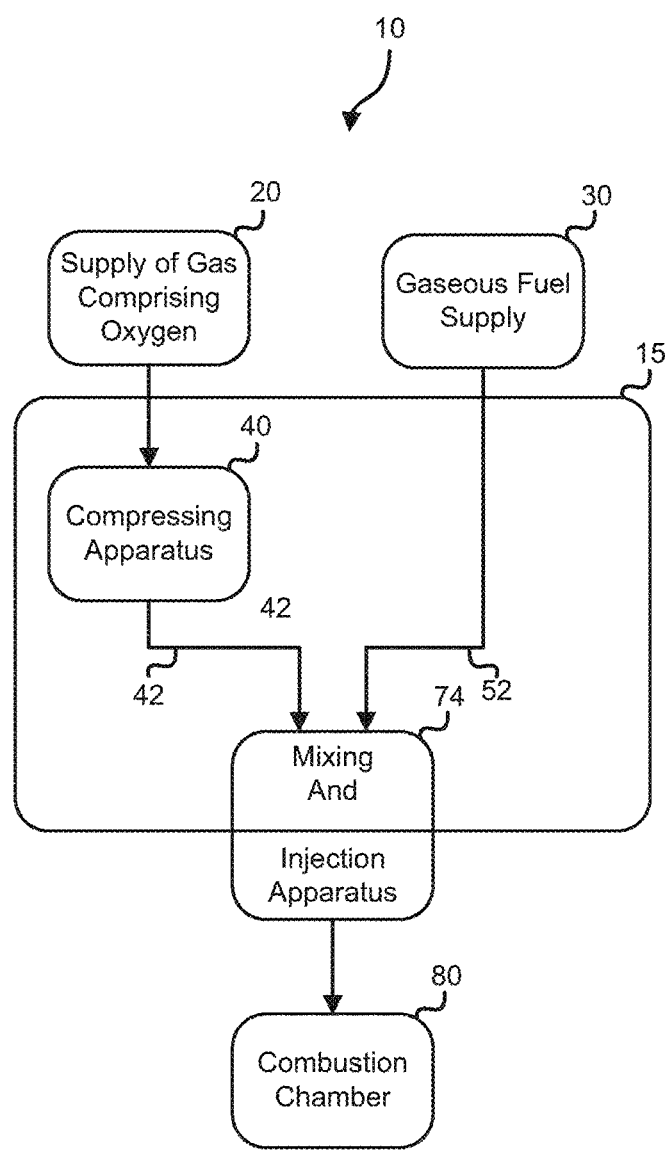
FIG. 4 is a schematic view of a direct injection apparatus for an internal combustion engine for enriching gaseous fuel with a gas comprising oxygen according to a second embodiment.

Referring now to FIG. 4, there is shown direct injection apparatus 10 for the internal combustion engine according to a second embodiment that is similar to the embodiment of FIG. 1 and with respect to this second embodiment and all subsequently described embodiments like parts have like reference numerals and may not be described in detail, if at all. Gaseous fuel supply 30 comprises compressed natural gas that is stored in cylinders (not shown) or suitable containers. Gaseous fuel from supply 30 is mixed with pressurized air from compressing apparatus 40 in mixing and injection apparatus 74. This embodiment is advantageous for systems that require a lower pressure gaseous-fuel/air mixture compared to the first embodiment of FIG. 1.

Figure 5:
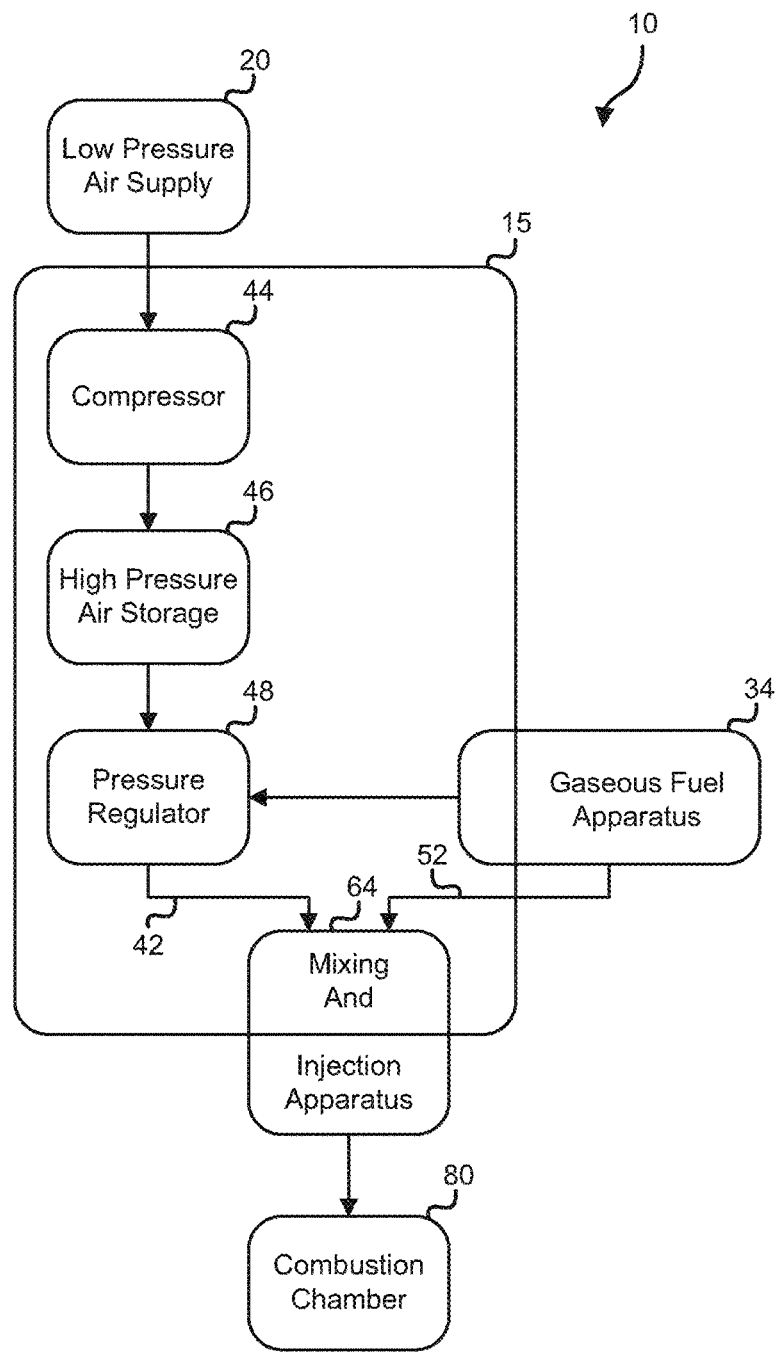
FIG. 5 is a schematic view of a direct injection apparatus for an internal combustion engine for enriching gaseous fuel with a gas comprising oxygen according to a third embodiment.

Referring to FIG. 5, there is shown direct injection apparatus 10 for the internal combustion engine according to a third embodiment. Mixture forming apparatus 15 comprises compressor 44 for compressing air from a low pressure in supply 20 to a pressure that is equivalent or higher than gaseous fuel pressure in piping 52. Low pressure air supply 20 can be air from an intake manifold for example, or from other sources. Compressed air is stored in high pressure storage 46, which can be piping and/or a vessel such as an accumulator. Gaseous fuel apparatus 34 comprises supply 30 and compressing apparatus 50 which employs conventional components to deliver pressurized gaseous fuel, and the selection of such components vary depending upon application requirements as would be known to those familiar with this technology. Gaseous fuel is stored in a liquid or gas state in apparatus 34, and alternatively apparatus 34 can receive gas from a residential or commercial gas line. A pumping apparatus (not shown) pressurizes the gaseous fuel in apparatus 34. The pressure of air in storage 46 is higher than the pressure of gaseous fuel in piping 52 in the present embodiment. Pressure regulator 48 controls the bias pressure between high pressure air from storage 46 and gaseous fuel from apparatus 34. The bias pressure controls the amount of air entrained into the gaseous fuel in mixer 64. During operation of the internal combustion engine, the bias pressure set by regulator 48 can be continuously adjusted as a function of engine operating conditions. By adjusting the bias pressure, the amount of air introduced into the gaseous fuel stream can be changed resulting in gaseous-fuel/air mixtures of different ratios for different operating conditions of the engine.

Figure 6:
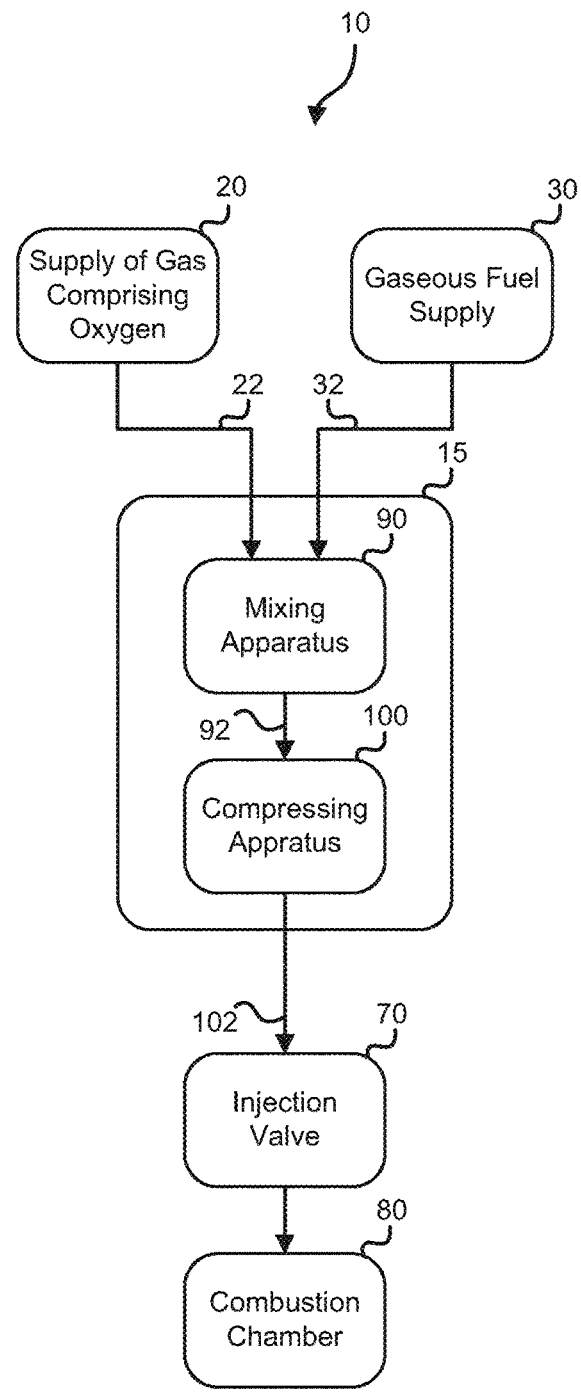
FIG. 6 is a schematic view of a direct injection apparatus for an internal combustion engine for enriching gaseous fuel with a gas comprising oxygen according to a fourth embodiment.

Referring now to FIG. 6, there is shown direct injection apparatus 10 for the internal combustion engine according to a fourth embodiment. Air from supply 20 and gaseous fuel from supply 30 are mixed in mixing apparatus 90 such that the non-ignitable mixture in piping 92 has the predefined equivalence ratio. Mixing apparatus 90 can regulate the bias pressure between air in piping 22 and gaseous fuel in piping 32 such that the predefined equivalence ratio is achieved when mixing. Compressing apparatus 100 increases the pressure of the non-ignitable mixture in piping 92 and regulates the pressure of the non-ignitable mixture in piping 102. Injection valve 70 introduces the non-ignitable mixture in piping 102 directly in combustion chamber 80.

In all embodiments, there are several advantages to introducing a gaseous-fuel/air non-ignitable mixture into combustion chamber 80. Injecting a gaseous-fuel/air non-ignitable mixture results in enhanced turbulence level and duration since for a given amount of gaseous fuel injected, the total amount of gas (gaseous fuel and air) injected is increased. The increased total kinetic energy from the gas jet (comprising gaseous fuel and air) significantly boosts the turbulence level of the combustion chamber. Unlike the kinetic energy in the charge air, the turbulent kinetic energy in the jet is more focused on the key mixing and combustion zone, and is thus much more effective in increasing the burning rate. Injecting a gaseous-fuel/air non-ignitable mixture results in a lower mixture temperature at given equivalence ratio. The air in the initial gaseous-fuel/air non-ignitable mixture prior to injection has lower temperature than the air in the combustion chamber during injection. As a result, for a given equivalence ratio, the mixture temperature is reduced. Consequently, the flame temperature is also reduced. Such a reduction favors reducing the formation of nitrogen oxides and PM precursors. The effect is more pronounced in the high equivalence ratio region, thus its effectiveness on PM formation is more prominent. Injecting a gaseous-fuel/air non-ignitable mixture results in lower residence time of gaseous-fuel/air non-ignitable mixture in high equivalence ratio zone. The air mixed in the fuel stream by mixer 64 reduced the overall equivalence ratio in the core of the jet. Coupled with the enhanced turbulence level, the residence time of the gaseous-fuel/air non-ignitable mixture in the high soot formation zone, namely for regions where gaseous-fuel/air equivalence ratio is higher than three (3), is significantly reduced. The reduction of the residence time in this zone limits the formation of soot precursors such as acetylene and benzene, which leads to a lower PM formation rate. Injecting a gaseous-fuel/air non-ignitable mixture allows the engine to be calibrated for improved transient response during transient operation from low load to high load. During this transient operation the pressure bias between the high pressure air and mixer 64 can be rapidly adjusted to increase the amount of air entrained into the gaseous fuel. This can partially or completely offset the effect of increased equivalence ratio as a result of lag in the air handling system of the engine. Injecting a gaseous-fuel/air non-ignitable mixture results in better injector stability since for the modes where the amount of gaseous fuel injected is very small the injector can show poor stability and larger shot-to-shot variation. With air entrainment, injection duration can be increased due to increased total mass.

Figure 7:
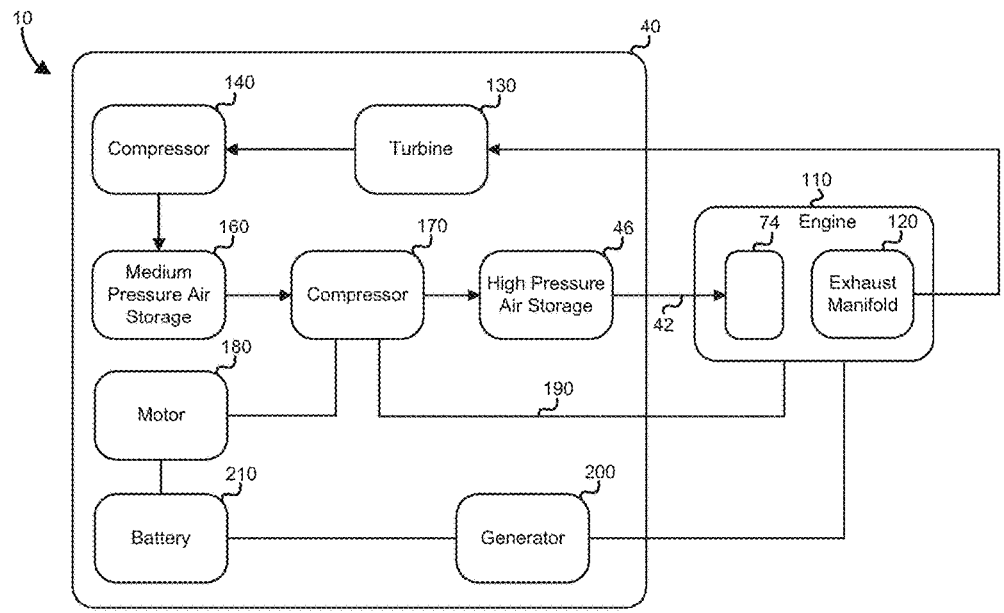
FIG. 7 is a schematic view of a compressing apparatus of the direct injection apparatus of FIG. 1 and FIG. 2 according to a first embodiment.

Referring now to FIG. 7 there is shown a schematic view of compressing apparatus 40 in direct injection apparatus 10 according to a first embodiment. The embodiment of FIG. 7 illustrates a technique of pressurizing air from low pressure to high pressure available in piping 42. One issue with compressing air to a high injection pressure is the relatively high energy consumption. Since air is a compressible fluid, compressing air from atmospheric pressure (low pressure) to high pressure requires significantly higher energy than compressing liquid fuel such as diesel. Compressing apparatus 40 employs energy available in exhaust gases from exhaust manifold 120 for assisting with compression of air. The exhaust gases drive turbine 130 which drives compressor 140 to compress intake air from the intake manifold of engine 110, a portion of which can be captured by medium pressure storage 160. The air in medium pressure storage 160 is further compressed by compressor 170 and stored in high pressure storage 46. Compressor 170 can be driven by motor 180 or alternatively by power take-off 190 of engine 110. Power take-off 190 comprises a direct mechanical drive from engine 110. When engine 110 propels a vehicle, the momentum of the vehicle can be converted when braking by engine 110 to drive electric generator 200 to create electricity employed by electric motor 180 to drive compressor 170. Generator 200 can drive motor 180 directly, or can store generated electricity into battery 210 from which the motor would then be powered. Compressors 140 and 170 can be operated at modes that would otherwise be inefficient and produce poor emissions. Such mode shift can be arranged to improve the overall efficiency and reduce emissions over given drive cycles of the engine.

Figure 8:
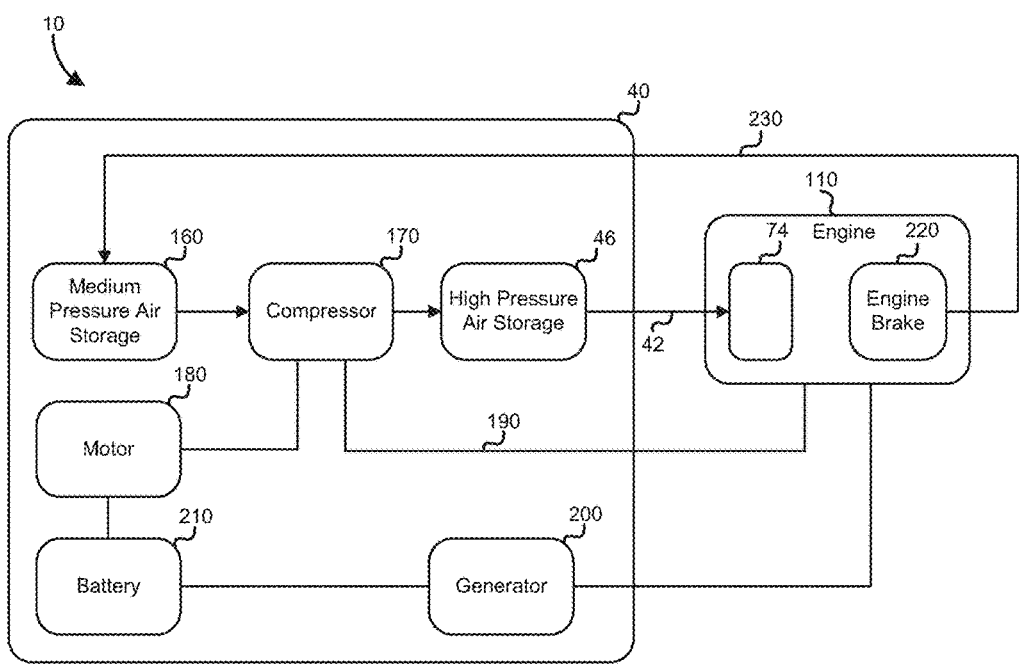
FIG. 8 is a schematic view of a compressing apparatus of the direct injection apparatus of FIG. 1 and FIG. 2 according to a second embodiment.

Referring now to FIG. 8 there is shown a schematic view of compressing apparatus 40 in direct injection apparatus 10 according to a second embodiment. Apparatus 40 employs energy available in the momentum of a vehicle propelled by engine 110 for assisting with compression of air. Energy from the momentum of the vehicle can be employed to compress air into a brake box (not shown) by way of engine brakes 220. A portion of the air stored or to be stored in the brake box can be captured by medium pressure storage 160 over piping 230.

Figure 9:
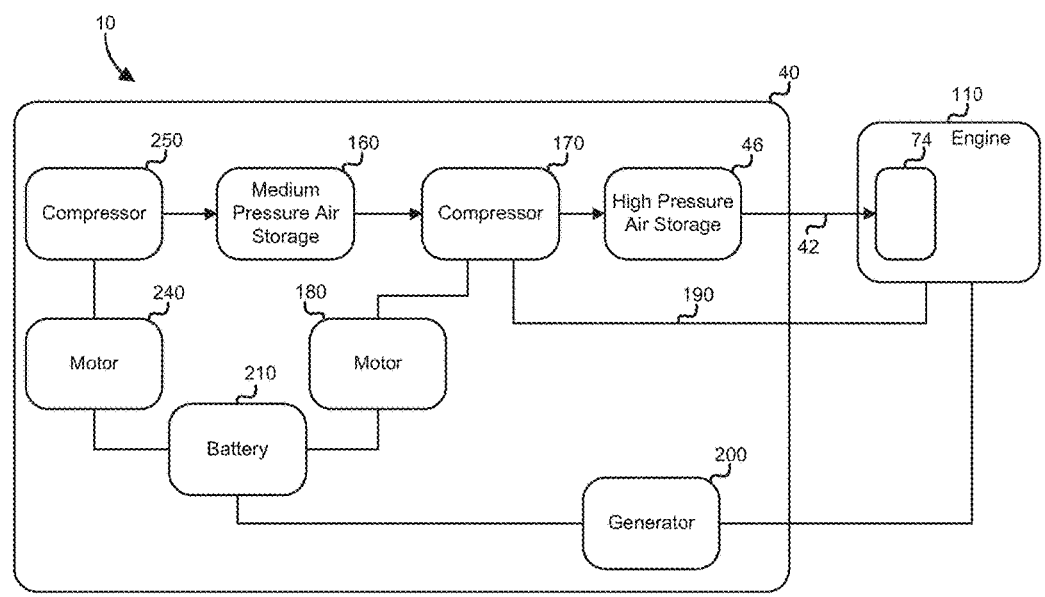
FIG. 9 is a schematic view of a compressing apparatus of the direct injection apparatus of FIG. 1 and FIG. 2 according to a third embodiment.

Referring now to FIG. 9 there is shown a schematic view of compressing apparatus 40 in direct injection apparatus 10 according to a third embodiment. Motor 240 drives compressor 250 which compresses air from intake manifold (not shown) of engine 110 from near atmospheric pressure to the medium pressure in storage 160.

The techniques of pressurizing air from near atmospheric pressure to high pressure in storage 46 disclosed in the embodiments of FIGS. 7, 8 and 9 can be combined in other embodiments according to application requirements. The energy available in exhaust gases and in the momentum of the vehicle can be employed to assist with compression of air to high pressure in storage 46 and then returned to engine 110 during injection to provide positive work to the system. Compressors 140, 170 and 250 can be operated at modes that would otherwise be inefficient and produce poor emissions. Such mode shift can be arranged to improve the overall efficiency and reduce emissions over given drive cycles of the engine. Air in storage 46 can be cooled before it is introduced to mixing and injection apparatus 74, either by heat exchange with LNG or some other form of cooling.

Figure 10:
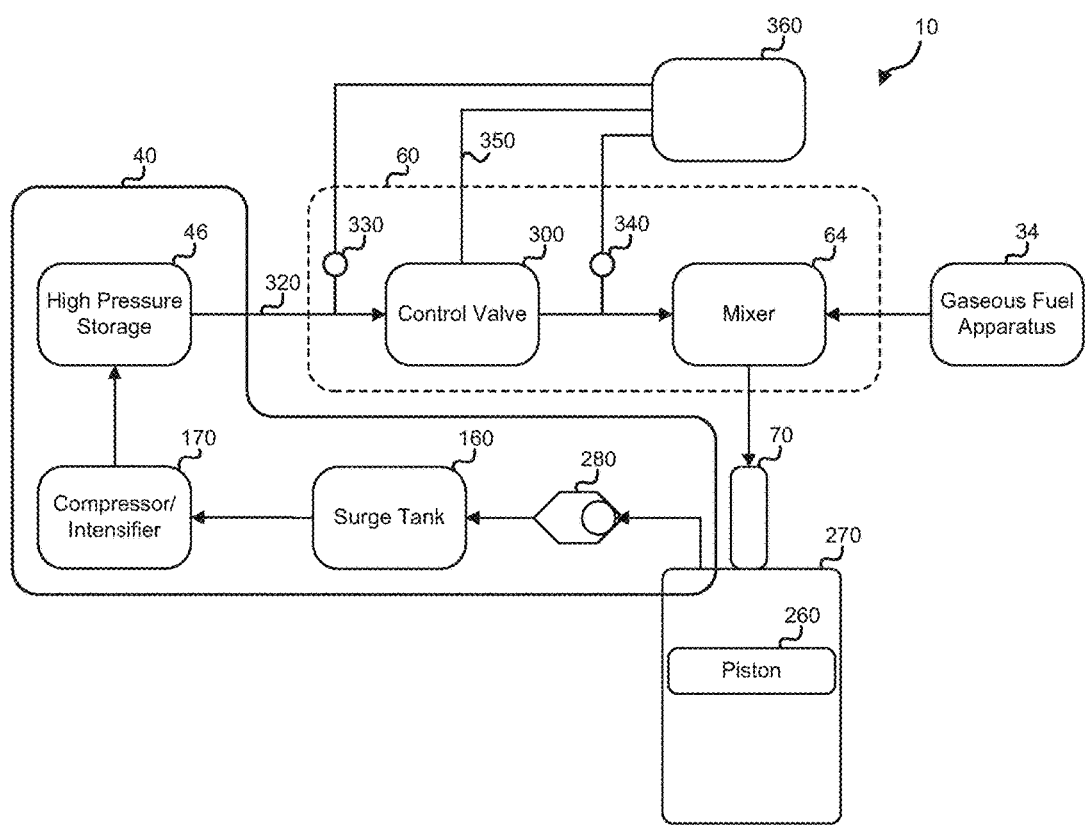
FIG. 10 is a schematic view of a direct injection apparatus for an internal combustion engine for enriching gaseous fuel with a gas comprising oxygen according to a fifth embodiment.

Referring to FIG. 10, there is shown direct injection apparatus 10 according to a fifth embodiment. Compressing air from atmospheric pressure to a high injection pressure requires relatively high energy consumption. To reduce this energy consumption apparatus 10 employs piston 260 and cylinder 270 of the internal combustion engine as a first stage compressor to compress air. In other embodiments an engine cylinder or multiple cylinders can be employed to assist with compression of air. Energy consumption for air compression is a function of air pressure ratio, and therefore compressing air from end of compression pressure to high injection pressure takes significantly less energy than compressing air from atmospheric pressure. As piston 260 compresses air within cylinder 270 one-way check valve 280 opens due to the differential pressure across the valve allowing a portion of compressed air to escape into medium pressure storage 160, which in the present embodiment is also called a surge tank. Compressor 170 further compresses air from surge tank 160 which is then stored high pressure storage 46. When gaseous fuel apparatus 34 employs liquefied natural gas (LNG), a heat exchanger can be employed between air and LNG to provide cooling of air to below ambient temperature between compressor stages which increases compressor efficiency. In other embodiments a charge air cooler can be employed to cool the air between compressor stages. Control valve 300 receives high pressure air over piping 320 and meters air into mixer 64 when actuated by control signal 350, where it is mixed with gaseous fuel from apparatus 34. Pressure sensors 330 and 340 provide air pressure signals representative of air pressure in respective piping to electronic controller 360. Controller 360 generates control signal 350 as a function of the differential pressure between signals 330 and 340 and gaseous fuel pressure determined from an engine map or measured from a gaseous fuel pressure sensor (not shown) in apparatus 34.

Figure 11:
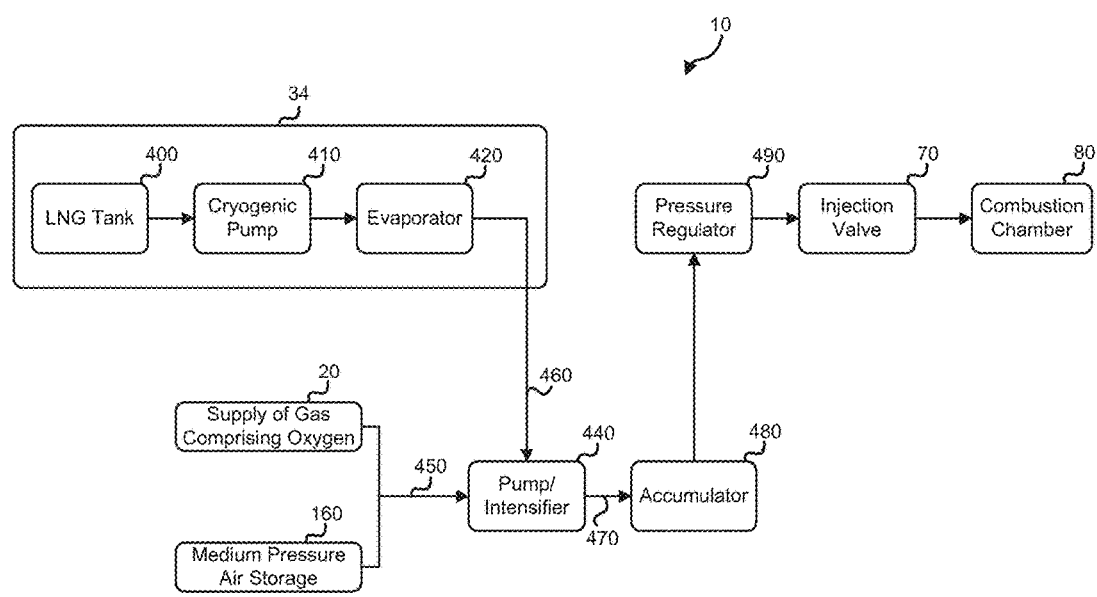
FIG. 11 is a schematic view of a direct injection apparatus for an internal combustion engine for enriching gaseous fuel with a gas comprising oxygen according to a sixth embodiment.

Referring now to FIG. 11, there is shown direct injection apparatus 10 according to a sixth embodiment. Gaseous fuel apparatus 34 stores a cryogenic fuel, such as liquefied natural gas (LNG) in storage tank 400. Cryogenic pump 410 pumps liquefied fuel through evaporator 420, where it undergoes a change of state to gas, and pressurizes the gaseous fuel in piping 460 as a function of operating conditions of the engine. Medium pressure air from storage 160 is delivered over piping 450 to pump 440, where it is mixed and intensified with gaseous fuel in piping 460 according to a partial pressure mixing method as will be discussed in more detail below. The gaseous-fuel/air non-ignitable mixture is delivered to accumulator 480 through piping 470. As is understood by those familiar with the technology, accumulator 480 can comprise a vessel or appropriately sized piping. Pressure regulator 490 adjusts the pressure of the gaseous-fuel/air non-ignitable mixture as a function of engine operating conditions and supplies the pressure regulated mixture to injection valve 70 which introduces the non-ignitable mixture to combustion chamber 80 in the internal combustion engine.

Figure 12A:
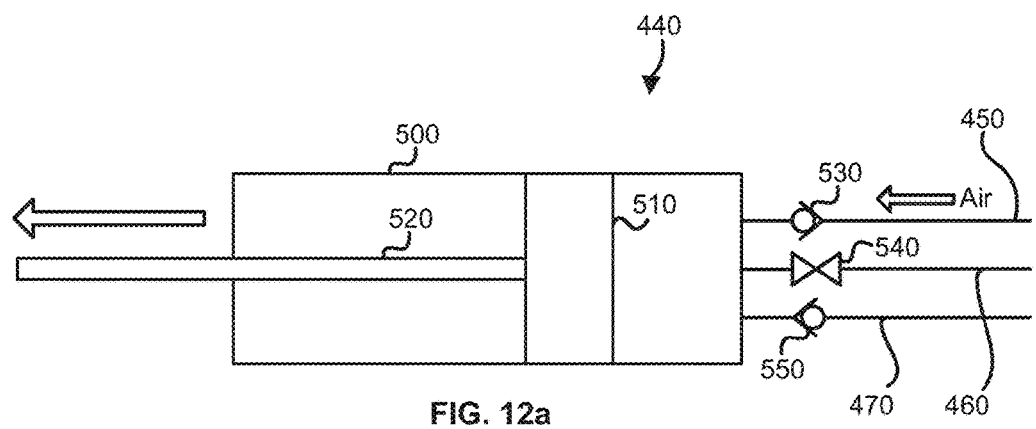
FIG. 12a is a schematic view of a pump for mixing gaseous fuel with a gas comprising oxygen shown during an intake stroke when the gas comprising oxygen is introduced into the pump for the direct injection apparatus of FIG. 11.
Figure 12B:
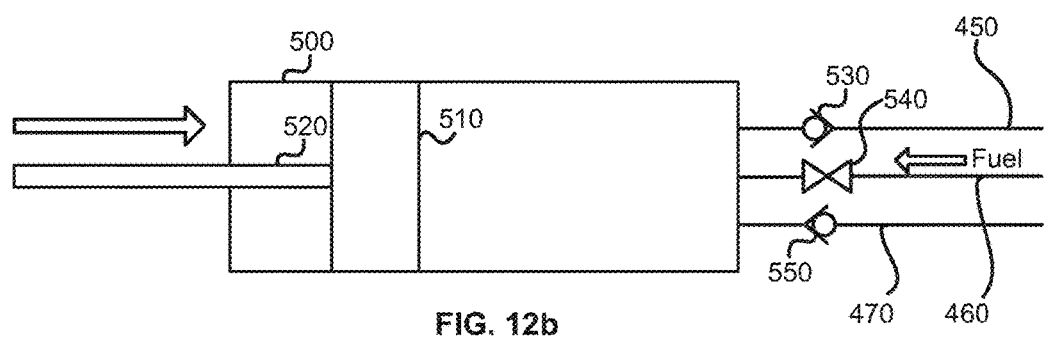
FIG. 12b is a schematic view of the pump of FIG. 12a shown during a compression stroke when the gas comprising oxygen is no longer introduced and gaseous fuel is introduced.
Figure 12C:
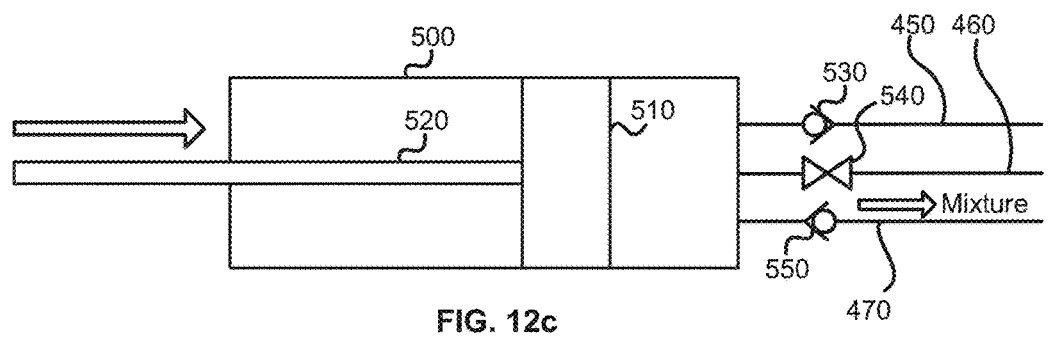
FIG. 12c is a schematic view of the pump of FIG. 12a shown further along the compression stroke then in FIG. 12b when a non-ignitable mixture of the gaseous fuel and the gas comprising oxygen is compressed and delivered outside the pump.

With reference to FIGS. 12*a*, 12*b* and 12*c* the partial pressure mixing method of pump 440 is now discussed. Pump 440 is a reciprocating piston pump comprising cylinder 500, piston 510 and piston rod 520, as well as other conventional components as is understood by those familiar with the technology. Pump 440 functions as a mixing-compressing apparatus. During the intake stroke illustrated in FIG. 12*a*, air is introduced into pump 440 through one-way check valve 530 while valve 540 is closed blocking flow of gaseous fuel. For example only, for a 50/50 gaseous-fuel/air mixture by mass at 300 bar, the partial pressure required for air is approximately 106 bar, or roughly one third of the final mixture pressure while the pressure of gaseous fuel is approximately 300 bar. During the compression stroke illustrated in FIG. 12*b*, one-way check valve 530 closes and solenoid valve 540 is opened by a control signal from a controller (not shown) such that fuel is introduced into pump 440 mixing with air. In other embodiments of the partial pressure mixing method it is possible that gaseous fuel is introduced to pump 440 through valve 540 during the intake stroke after a predetermined amount of air is introduced such that by introducing the gaseous fuel check valve 530 closes. Continuing with the compression stroke in FIG. 12*c*, the non-ignitable mixture is then further compressed to the delivery pressure of around 300 bar and output through one-way check valve 550 into piping 470. The proportion of gaseous fuel to air can be adjusted by control of the opening time and duration of solenoid valve 540, and by control of air pressure in piping 450. The pressure of air required in piping 450 before being introduced to pump 440 is approximately one third of the final delivery pressure. This reduced air pressure is possible due to pressurizing gaseous fuel to the final delivery pressure (300 bar) to within a predetermined range of tolerance, which requires a relatively low energy consumption since gaseous fuel is pressurized by pump 410 which pumps a liquefied gas, and pumping a liquid is much more efficient then pumping a gas.

Figure 13:
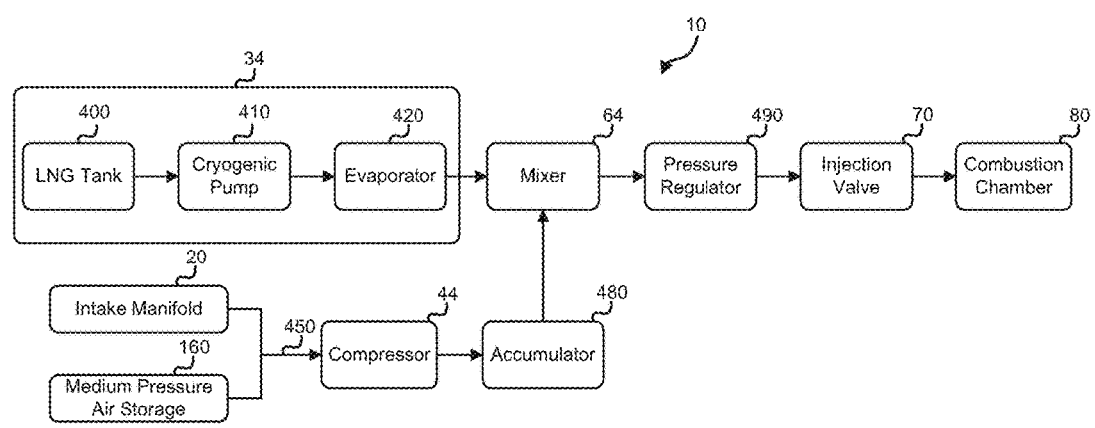
FIG. 13 is a schematic view of a direct injection apparatus for an internal combustion engine for enriching gaseous fuel with a gas comprising oxygen according to a seventh embodiment.

Referring now to FIG. 13, there is shown direct injection apparatus 10 according to a seventh embodiment which differs from the embodiment of FIG. 11 in the technique of mixing air and gaseous fuel. One of low pressure air from supply 20 and medium pressure air from storage 160 is pressurized by compressor 44 and stored in accumulator 480. Gaseous fuel from evaporator 420 is enriched with air from accumulator 480 in mixer 64, which can be a conventional mixer.

Figure 14:
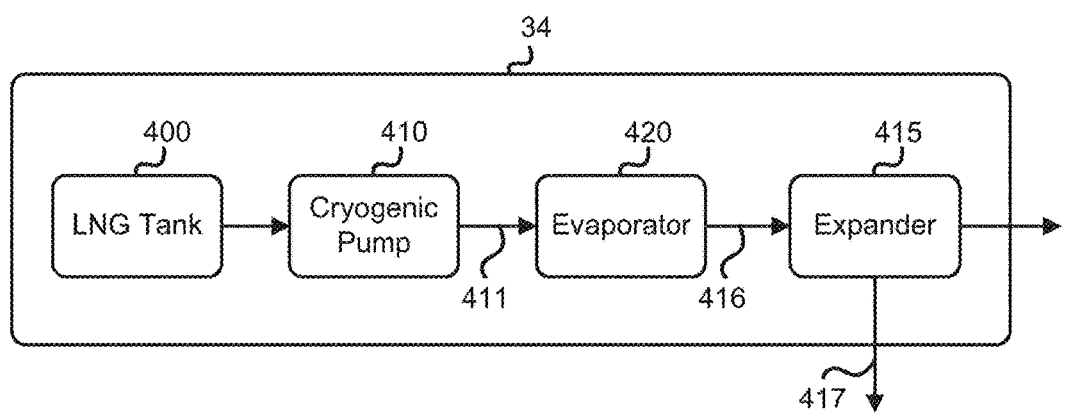
FIG. 14 is a schematic view of an apparatus for generating mechanical energy that can be employed to drive a compressor to pressurize air or a gaseous-fuel/air mixture.

Referring to FIG. 14, a technique is illustrated for generating mechanical energy that can be employed to drive a pump or compressor. Cryogenic pump 410 over-pressurizes LNG such that the pressure in piping 411 is higher than that required for a consumer downstream of evaporator 420. The extra energy stored in the pressurized LNG can generate useful work by routing vaporized LNG through expander 415 such that the pressure drops to a level required by the consumer downstream of expander 415. As the pressurized gaseous fuel passes through expander 415 it turns shaft 417 that can be employed to drive a compressor or pump to compress air or the gaseous-fuel/air mixture. Since LNG is an incompressible liquid it can be pressurized relatively efficiently, and this can be used to advantage in the present technique when other more efficient means to drive the compressors and pumps are not available.

Figure 15:
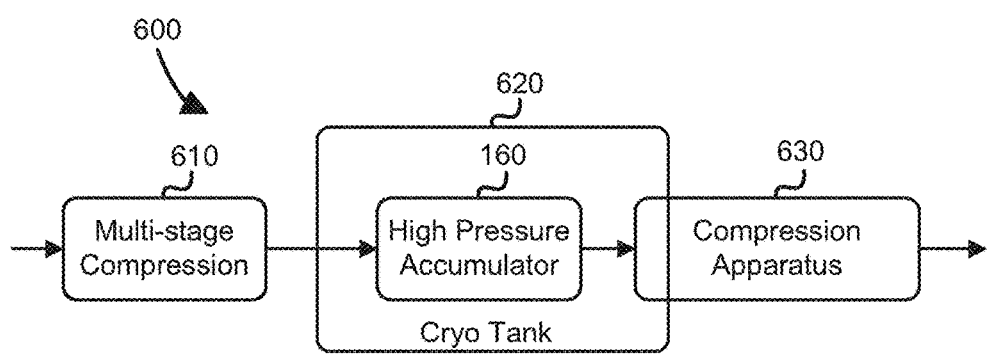
FIG. 15 is a schematic view of a compression apparatus for improving air pressurization efficiency.

Referring to FIG. 15, a technique for increasing air pressurization efficiency comprising apparatus 600 is illustrated. Multi-stage compression apparatus 610 receives air at low pressure and employs two or more stages of compression to pressurize the air to a medium pressure. Techniques of air pressurization from low pressure to medium pressure discussed in previous embodiments can be employed, as well as other known techniques. Air from apparatus 610 is stored in accumulator 160 that is located inside cryogenic tank 620. In a preferred embodiment cryogenic tank 620 is made to store a liquefied gaseous fuel, such as liquefied natural gas (LNG) or liquefied petroleum gas (LPG), in other embodiments tank 620 can store cryogenic fluids. By placing accumulator 160 in tank 620 the temperature of pressurized air received from compression apparatus 610 is reduced and its density is correspondingly increased. Preferably the temperature of air in accumulator 160 is reduced near to or at the cryogenic temperature within tank 620. The pressurized and cooled air within accumulator 160 is further compressed to a high pressure by compression stage 630. It takes less energy for compression apparatus 630 to compress air from accumulator 160 then to compress an equivalent mass of air directly received from multi-stage compression apparatus 610 due to the increased density of air in accumulator 160. In a preferred embodiment compression apparatus 630 is a last stage compression such that air from the apparatus is subsequently mixed with gaseous fuel downstream without further compression. In a preferred embodiment compression apparatus 630 comprises a cryogenic pump operable to pressurize a cryogenic fluid, such as liquefied gaseous fuel, air or a combination of both. The cryogenic pump comprises one or more intake ports for the cryogenic fluids which can be internal or external to tank 620. When the pressurized fluid from compression apparatus 630 comprises a mixture of liquefied gaseous fuel and air the non-ignitable mixture can be delivered to a heat exchanger for vaporization.

Figure 16:
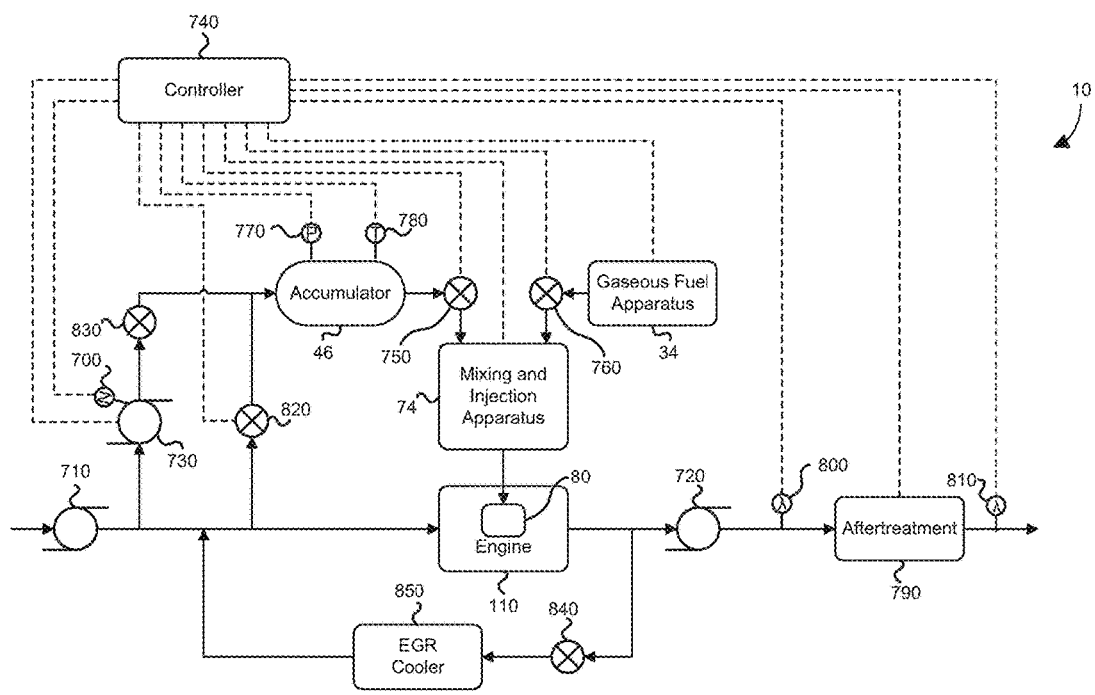
FIG. 16 is a schematic view of a direct injection apparatus for an internal combustion engine for enriching gaseous fuel with a gas comprising oxygen according to an eighth embodiment.

Referring to FIG. 16, there is shown direct injection apparatus 10 for internal combustion engine 110 according to an eighth embodiment. A technique for controlling the mixture ratio between gaseous fuel and air is described in this embodiment, as well as techniques for enabling and disabling air enrichment and the air compression system. Compressor 710, driven by turbine 720, receives air from an intake pipe of engine 110 and provides a first stage compression. Compression apparatus 730 receives a portion of air from compressor 710 and employs at least one further stage of compression to pressurize air to high pressure stored in accumulator 46 (which can comprise a vessel or appropriately sized piping). In a preferred embodiment apparatus 730 employs three more stages of compression. Techniques discussed in previous embodiments for pressurizing air can be employed by apparatus 730. Controller 740 controls valves 750 and 760 to meter air from accumulator 46 and gaseous fuel from apparatus 34 into mixing and injection apparatus 74 where a gaseous-fuel/air non-ignitable mixture is formed and then directly introduced into combustion chamber 80. A pressure signal from sensor 770 and a temperature signal from sensor 780 are received by controller 740 and employed to determine the density of air in accumulator 46. Controller 740 actuates valve 750 with a control signal to adjust and regulate the mass flow rate of air into mixing and injection apparatus 74 such that the mixture ratio between gaseous fuel and air can be controlled. An exemplary control signal is a pulse width modulated (PWM) signal comprising a settable frequency and an adjustable duty cycle. Controller 740 adjusts the duty cycle of the PWM signal as a function of air density in accumulator 46 and engine operating conditions to adjust and regulate the mass flow rate of air through valve 750. In a preferred embodiment controller 740 commands valve 760 to be continuously open during normal operation of engine 110. In other embodiments controller 740 can adjust and regulate the mass flow rate of gaseous fuel through valve 760 by actuating the valve with a second PWM signal. Aftertreatment apparatus 790 is employed in the exhaust path of engine 110 to reduce undesirable emissions. Lambda sensors 800 and 810 provide signals to controller 740 representative of oxygen concentration upstream and downstream of aftertreatment apparatus 790, which allows the controller to determine the emission reduction performance of the aftertreatment apparatus. The mixture ratio of the gaseous-fuel/air non-ignitable mixture formed in apparatus 74 can be adjusted based on the performance of aftertreatment apparatus 790 to influence the emissions in the exhaust path of engine 110 upstream of the aftertreatment apparatus. Bypass valve 820 can be opened by controller 740 to direct air from compressor 710 directly to accumulator 46. Shut-off valve 830 can be closed by controller 740 to control the introduction of air and exhaust gases into accumulator 46. Exhaust gases are routed through EGR valve 840 and EGR cooler 850 as a function of engine operating conditions. As is known by those familiar with this technology, other conventional components employed in gaseous fuelled internal combustion engines are not shown, but are employed according to individual application requirements.

Enrichment of gaseous fuel with air can be selectively enabled and disabled by controller 740 in direct injection apparatus 10. This is particularly advantageous when emission reduction improvements are only required during particular regions of the engine operating map (torque vs engine speed), or during transient condition when the engine is transitioning between operating points on the map. During transient operating conditions particulate matter emissions are particularly increased as a result of an increase in fuel flow but with a lag in the increase of charge air flow due to turbocharger lag. By selectively enabling air enrichment of gaseous fuel when it is required, some of the components of apparatus 10 can be reduced in size, weight and cost, and engine efficiency can be increased by decreasing the energy consumed for compressing air and associated parasitic losses for "always-on" air enrichment systems thereby improving fuel economy. For example, accumulator 46 and compressor apparatus 730 can be reduced in size and capacity if they are to provide compressed air for only a portion of the engine map and/or during transient conditions. Controller 740 commands valve 750 to be closed to disable air enrichment, and commands compression apparatus 730 and valve 830 to enable or disable compression of air accordingly. Transient engine operating conditions can be detected by measuring air flow rate, or a surrogate such as boost pressure, and comparing this to the expected air flow rate (or surrogate) for the current engine operating condition (engine speed and throttle position) in the engine map. For improved emission reductions during transient only air enrichment operation, the pressure of air in accumulator 46 should be close to injection pressure, and preferably above gaseous fuel pressure.

Figure 17:
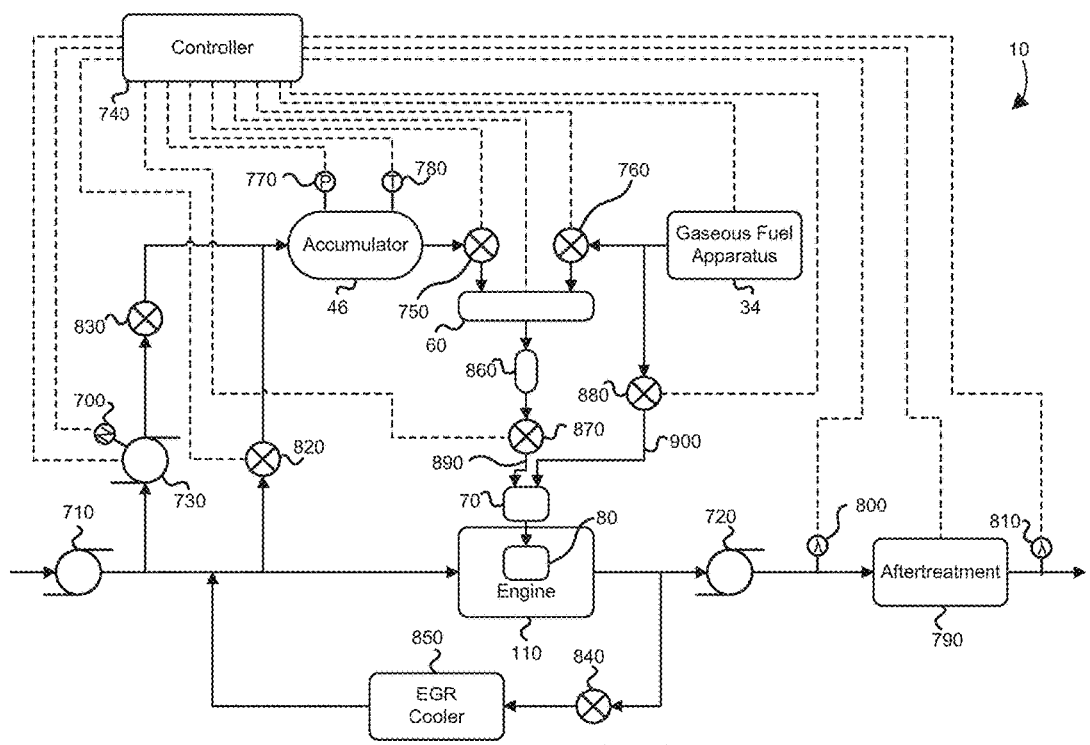
FIG. 17 is a schematic view of a direct injection apparatus for an internal combustion engine for enriching gaseous fuel with a gas comprising oxygen according to a ninth embodiment.

Referring now to FIG. 17, there is shown direct injection apparatus 10 for internal combustion engine 110 according to a ninth embodiment, which is similarly to the previous embodiment of FIG. 16 and advantageous when employing air enrichment of gaseous fuel for transient engine operating conditions only, or for operating in certain regions of the engine map. Controller 740 commands valve 880 open and valve 870 closed when engine 110 consumes only gaseous fuel, and commands valve 880 closed and 870 open when consuming the gaseous-fuel/air non-ignitable mixture, both of which are introduced to combustion chamber 80 through injection valve 70. Accumulator 860 stores the gaseous-fuel/air non-ignitable mixture such that it is immediately available for injection through valve 70 during transient engine operating conditions. As is understood by those familiar with the technology, accumulator 860 can be a vessel or appropriately sized piping between mixing apparatus 60 and valve 870. The volume of piping 890 and the volume of piping 900 are kept small such that the gaseous-fuel/air non-ignitable mixture with a predetermined equivalence ratio within a range of tolerance can be injected into combustion chamber 80 as soon as possible after valve 870 is opened and valve 880 is closed. When valve 870 is closed, controller 740 commands compression apparatus 730, mixing apparatus 60 and valves 750, 760 and 830 such that accumulator 860 is filled with the gaseous-fuel/air non-ignitable mixture up to a predetermined pressure. A pressure sensor (not shown) associated with accumulator 860 provides a signal to controller 740 representative of the pressure in accumulator 860. When valve 870 is open, controller 740 commands the components of apparatus 10 such that the gaseous-fuel/air non-ignitable mixture is available for combustion in engine 110.

Figure 23:
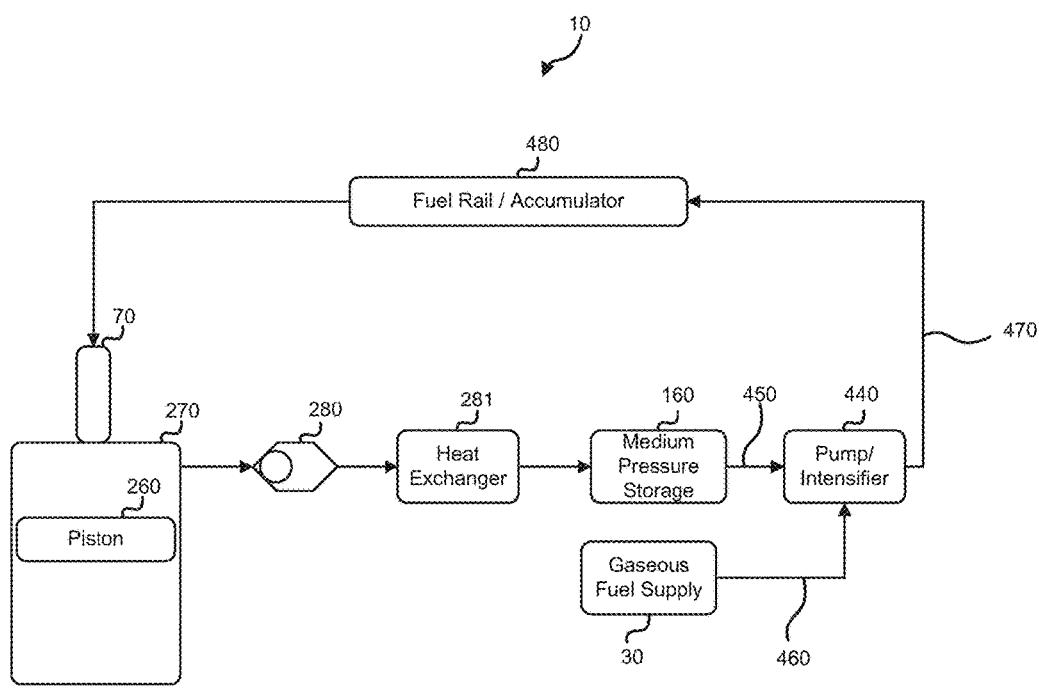
FIG. 23 is a schematic view of a direct injection apparatus for an internal combustion engine for enriching gaseous fuel with a gas comprising oxygen according to a tenth embodiment.

Referring now to FIG. 23, there is shown direct injection apparatus 10 according to a tenth embodiment that combines some features of the embodiments of FIGS. 10 and 11. Air compressed by piston 260 in cylinder 270 is bled out of the cylinder and through check valve 280 and heat exchanger 281 (employed to cool the compressed cylinder air), and stored in medium pressure storage 160. In alternative embodiments cylinder 270 can comprise exhaust gases in addition to air, such as from internal and/or external exhaust gas recirculation apparatuses. Check valve 280 prevents, or at least reduces, backflow of air into cylinder 270. Air from medium pressure storage 160 is mixed with pressurized gaseous fuel from gaseous fuel supply 30 in pump 440 where the mixture is further pressurized and delivered to injection valve 70 through accumulator 480, which in a preferred embodiment is in the form of a fuel rail. Instead of metering fuel at the injector fuel metering can be realized in the intake stroke of pump 440, which can be substantially longer than the injector injection duration. This is particularly important for achieving more accurate fuel quantity control under low load conditions. In alternative embodiments, pump 440 can be replaced with a compressor that compresses only air to a pressure equal to or higher than gaseous fuel pressure such that mixing can be achieved in fuel rail 480. In this alternative embodiment gaseous fuel from supply 30 is communicated directly to fuel rail 480.

The air-enriched gaseous fuel embodiments described herein deliver oxygen and improve mixing rate at the location where they are required most. These embodiments do not require fuel injection at pressure higher than that of current fuel systems, so the requirement for system modification is relatively small. They reduce oxygen starvation problems during transient state, a problem that is not solved by other techniques. They include techniques for recovering, storing and employing waste energy to increase air pressure which increases system efficiency. A homogenous non-ignitable mixture of air and gaseous fuel can be formed upstream of the fuel injector or inside the fuel injector. Unlike air-assisted liquid fuel injection, pressurized air is not required to drive gaseous fuel during the injection event. When the enrichment of the gaseous fuel is turned off the engine can still operate. In the embodiment of FIG. 11, the air can be supplied at a much lower pressure than the injection pressure. Air modifies the thermal condition and reactivity of the core of the gaseous fuel jet. This is fundamentally different from air-assisted liquid fuel injection where air is mainly employed as a driver gas to supply momentum to the liquid fuel to help atomization. For this reason, the amount of air required for air-enriched gaseous fuel direct injection can be substantially less than air-assisted liquid fuel injection. The tolerance to variation in air mass flow is also substantially higher for air-enriched gaseous fuel direct injection compared to air-assisted liquid fuel injection, and performance improvements can be achieved with mass ratio between air and gaseous fuel between 0% and 100%.

The embodiments herein can be employed for steady state operation, transient operation and for both steady state and transient operation. The enrichment of gaseous fuel with air can be selectively enabled and disabled based on engine operating conditions such that emission targets can be met with reduced and preferably minimized power requirements for compressing air. Valves can be employed such that the bleeding of air (for example from the intake manifold or from the engine cylinders) can be selectively enabled and disabled. When optimized for transient operation the size of components employed (compressors, pumps, expanders, accumulators, mixers) are reduced in size providing a lower cost and lower footprint solution. The size of accumulators storing pressurized air and the gaseous-fuel/air non-ignitable mixture are reduced in size such that the pressure of air and the pressure of the gaseous-fuel/air non-ignitable mixture can be increased or reduced as a function of transient engine operating conditions with reduced time lag compared to embodiments with larger accumulators. Although in preferred embodiments aftertreatment systems are eliminated, it is also possible in other embodiments for aftertreatment systems to be employed in combination with the techniques taught herein. In these embodiments the aftertreatment systems preferably are reduced in at least one of capacity for emissions reductions, size and cost. In one such preferred embodiment, one of the techniques taught herein is employed with a passive aftertreatment system.

Figure 18:
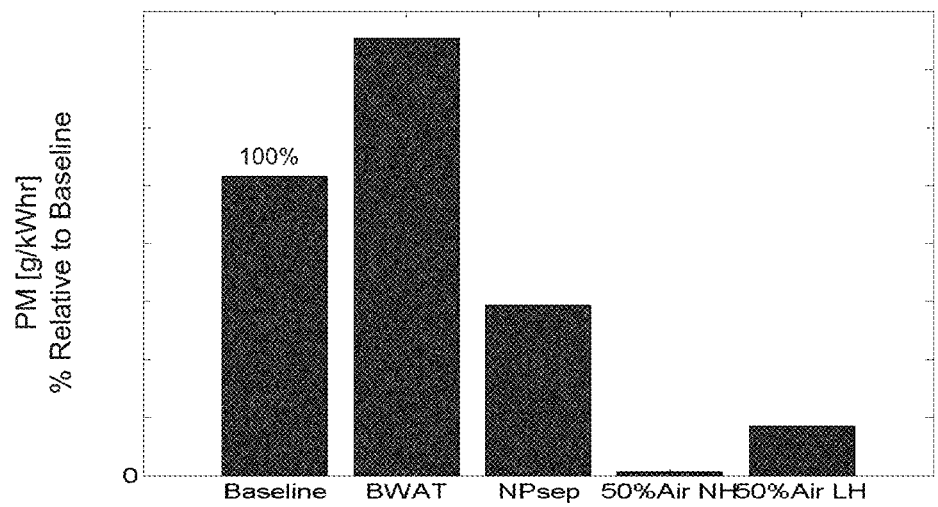
FIG. 18 is a graphical view of results of a computational fluid dynamics study illustrating particulate matter emissions for a baseline high pressure direct injection (HPDI) engine (Baseline), an HPDI engine with advanced timing (BWAT), a negative pilot separation engine configuration (NPsep), an HPDI engine configured for 50% by mass air enrichment with normal injection hole sizing (50% Air NH), and an HPDI engine configured for 50% by mass air enrichment with larger injection hole sizing (50% Air LH).
Figure 19:
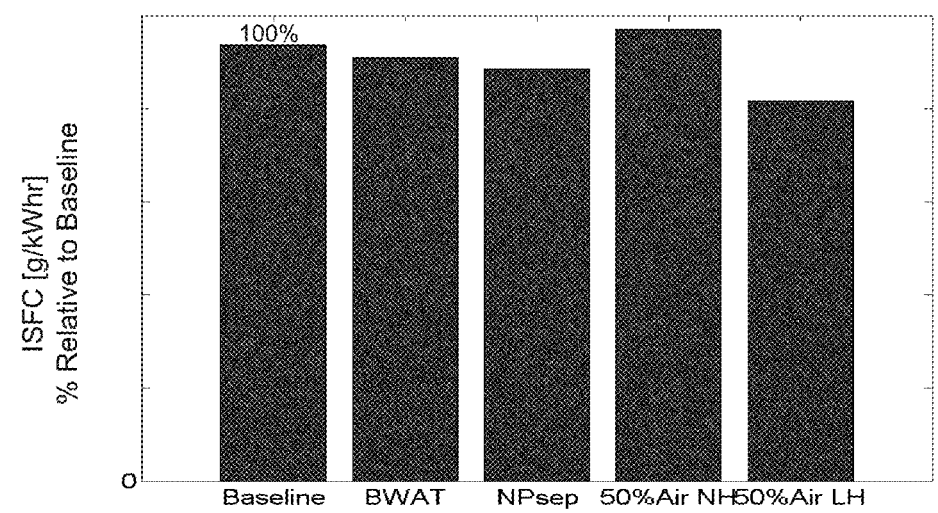
FIG. 19 is a graphical view of results of a computational fluid dynamics study illustrating indicated specific fuel consumption for a baseline high pressure direct injection (HPDI) engine (Baseline), an HPDI engine with advanced timing (BWAT), a negative pilot separation engine configuration (NPsep), an HPDI engine configured for 50% by mass air enrichment with normal injection hole sizing (50% Air NH), and an HPDI engine configured for 50% by mass air enrichment with larger injection hole sizing (50% Air LH).

A computational fluid dynamic (CFD) study has shown that significant reduction in PM and improvement in fuel economy can be achieved with 50% air addition (by mass) to the fuel stream. With reference to FIGS. 18 and 19, the study compared PM and indicated specific fuel consumption (ISFC) between a baseline high pressure direct injection (HPDI) engine (Baseline), an HPDI engine with advanced timing (BWAT), a negative pilot separation engine configuration (NPsep), an HPDI engine configured for 50% by mass air enrichment with normal injection hole sizing (50% Air NH), and an HPDI engine configured for 50% by mass air enrichment with larger injection hole sizing (50% Air LH). Negative pilot separation is a technique of injecting gaseous fuel before diesel pilot fuel such that premixing is increased and PM emission reduced. In the '50% Air LH' test case, injection hole diameter in the nozzle was enlarged such that total injection duration remained the same as that of the Baseline test case. Results of the study indicate that greater than 80% reduction in PM can be achieved while reducing ISFC with air entrainment at a high load condition for the '50% Air LH' test case. The mass distribution of the air-enriched jet shifts more rapidly to the lean side, compared to the Baseline case, which leads to significantly reduced PM. An added benefit of oxygenated fuel (air enriched fuel) is that the flame was broadened as a result of reduced jet equivalence ratio. Oxygenated fuel results in a broadened flame due to reduced jet equivalence ratio. This helps reduce unburned methane (UCH4) emission because with broadened flame, unburned methane is unlikely to escape the adiabatic flame temperature (AFT) curve to enter the lean quench zone. The AFT curve is a theoretical flame temperature without heat transfer. For a given gaseous fuel and oxidizer, AFT varies with equivalence ratio.

Figure 20:
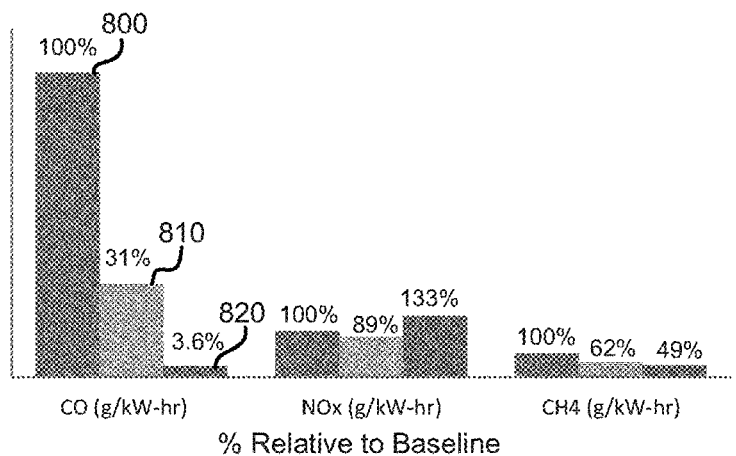
FIG. 20 is a graphical view of tests results from an experiment comprising a setup according to FIG. 1 in which three test cases were employed where air-gaseous fuel mass ratio percentage was varied between 0% (no air), 50% (one third air mixed with two thirds gaseous fuel by mass) and 100% (one half air mixed with one half gaseous fuel by mass), illustrating emission levels for carbon monoxide (CO), nitrous oxide (NOx) and unburned hydrocarbons (CH4) for each of the test cases.
Figure 21:
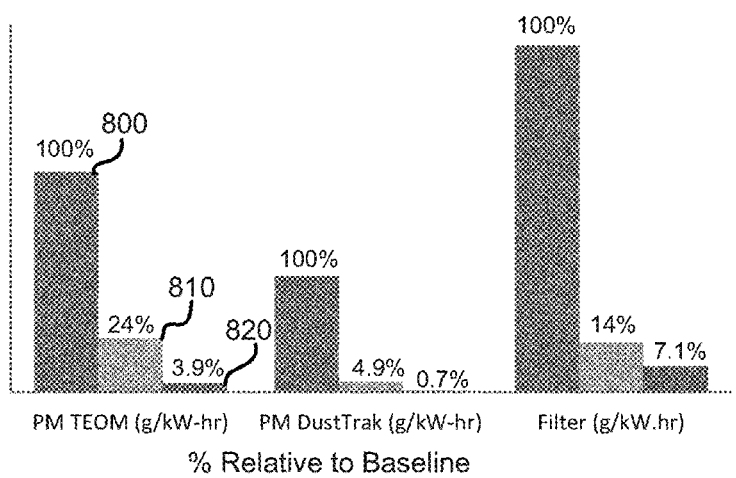
FIG. 21 is a graphical view of tests results from the experiment of FIG. 20 illustrating particulate matter emissions measured by three different techniques (PM TEOM, PM DustTrak and Filter) for each of the test cases.
Figure 22:
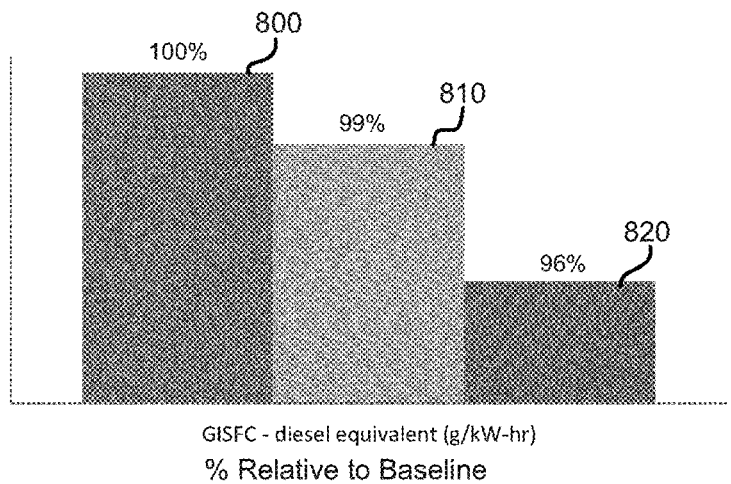
FIG. 22 is a graphical view of tests results from the experiment of FIG. 20 illustrating gross indicated specific fuel consumption for each of the test cases.

An experiment was conducted to verify CFD simulations results and to quantify emission and other benefits when introducing a gaseous-fuel/air non-ignitable mixture directly into the combustion chamber. A setup according to FIG. 1 was constructed employing a 15 micron filter between a 100 cubic centimeter mixer and a hydraulically actuated gaseous fuel injector. Air was compressed to 300 bar and gaseous fuel was compressed to 250 bar, prior to mixing, and the resultant mixture pressure was approximately 250 bar. The engine in which the injector was installed was configured to operate at 1500 rpm with a gross indicated mean effective pressure of 16 bar, an equivalence ratio of 0.66, an exhaust gas recirculation (EGR) percentage of 20%, a diesel flow rate of 0.3 kilograms/hour, a gaseous fuel-air mixture flow rate of 8.25 kilograms/hour and injection timing and ignition timing were controlled such that the integrated heat release curve reached its 50% value (CA50) at approximately 10° after top dead center (in the power stroke). Three test cases were employed where air/gaseous-fuel mass ratio percentage was varied between 0% (no air), 50% (one third air mixed with two thirds gaseous fuel by mass) and 100% (one half air mixed with one half gaseous fuel by mass). The test case with 0% mass ratio is the baseline that the other test cases were compared against. FIG. 20 illustrates emission levels for carbon monoxide (CO), nitrous oxide (NOx) and unburned hydrocarbons (UCH4) for each of the test cases indicated by reference numerals 800 (0% air/gaseous-fuel mass ratio), 810 (50%) and 820 (100%). FIG. 21 illustrates particulate matter emissions measured by three different techniques (PM TEOM, PM DustTrak and Filter). FIG. 22 illustrates gross indicated specific fuel consumption. These figures illustrate significant improvements in emissions when an air/gaseous-fuel non-ignitable mixture is injected into the combustion chamber. In comparing the 100% air/gaseous-fuel mass ratio percentage test case against the baseline, there were reductions in UCH4 emissions of over 50%, reductions in CO emissions of over 70%, and reductions in PM emissions of over 92%, while NOx emissions remained comparable and GISFC showed a slight improvement. The test results also indicate that the mixture ratio between air and gaseous fuel does not need to be tightly controlled, thereby reducing the complexity and cost of the system, since significant reductions in CO, UCH4 and PM emission were obtained with both the 50% and 100% test cases. These results underline the significant benefit obtained when directly introducing a non-ignitable mixture of air and gaseous fuel into the combustion chamber.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for introducing a gaseous fuel into a combustion chamber of an internal combustion engine comprising:
    forming in an apparatus, as a function of engine operating conditions, a mixture of said gaseous fuel and a gas comprising oxygen having a pressure suitable for directly introducing said mixture into the combustion chamber during at least the compression stroke; and
    injecting said mixture directly into the combustion chamber;
    wherein said mixture has a mass ratio between said gas comprising oxygen and said gaseous fuel less than the upper flammability limit mass ratio such that said mixture is non-ignitable.

2. The method of claim 1, further comprising at least one of:
    (a) wherein when said gaseous fuel comprises methane, said mixture comprises a mixture mass ratio (mass of gas comprising oxygen : mass of gaseous fuel) between 0:1 and 8.8:1;
    (b) wherein when said gaseous fuel comprises methane, said mixture comprises a mixture mass ratio (mass of gas comprising oxygen : mass of gaseous fuel) between 0:1 and 2:1;
    (c) wherein when said gaseous fuel comprises methane, said mixture comprises a mixture mass ratio (mass of gas comprising oxygen : mass of gaseous fuel) between 0.25:1 and 1:1; and
    (d) adjusting a mixture mass ratio between said gas comprising oxygen and said gaseous fuel in said mixture as a function of engine operating conditions.

3. The method of claim 1, further comprising:
    pressurizing said gaseous fuel as a function of engine operating conditions;
    compressing said gas comprising oxygen; and
    mixing said gaseous fuel and said gas comprising oxygen.

4. The method of claim 1, further comprising:
    pressurizing said gaseous fuel as a function of engine operating conditions;
    compressing said gas comprising oxygen;
    mixing said gaseous fuel and said gas comprising oxygen; and at least one of:
    (a) storing said gas comprising oxygen after said compressing;
    (b) wherein a pressure of said gas comprising oxygen is less than a pressure of said gaseous fuel when mixing;
    (c) wherein a pressure of said gas comprising oxygen is equal to a pressure of said gaseous fuel within a predetermined range of tolerance when mixing;
    (d) wherein a pressure of said gas comprising oxygen is greater than a pressure of said gaseous fuel when mixing;
    (e) wherein said mixing occurs inside a fuel injector;
    (f) wherein said mixing occurs upstream of a fuel injector;
    (g) further comprising regulating a bias pressure between said gaseous fuel and said gas comprising oxygen;
    (h) further comprising regulating a bias pressure between said gaseous fuel and said gas comprising oxygen; and adjusting said bias pressure as a function of engine operating conditions; and
    (i) further comprising regulating a bias pressure between said gaseous fuel and said gas comprising oxygen; and adjusting said bias pressure during transient engine operating conditions.

5. The method of claim 3, further comprising metering said gas comprising oxygen into said mixture as a function of a differential pressure across a control valve when mixing.

6. The method of claim 3, further comprising:
    pressurizing said gaseous fuel as a function of engine operating conditions;
    compressing said gas comprising oxygen;
    mixing said gaseous fuel and said gas comprising oxygen; at least one of:
    (a) wherein said compressing comprises at least one of:
    employing energy in exhaust gases of said internal combustion engine to compress said gas comprising oxygen;
    employing energy available in momentum of a vehicle propelled by said internal combustion engine to compress said gas comprising oxygen;
    employing a power take-off of said internal combustion engine to compress said gas comprising oxygen;
    employing a compression stroke of a cylinder in said internal combustion engine to compress said gas comprising oxygen;
    employing a hydraulically driven compressor; and
    employing an electrical compressor;
    (b) wherein compressing said gas comprising oxygen comprises at least two stages of compression, a first stage compression and a second stage compression;
    (c) wherein compressing said gas comprising oxygen comprises at least two stages of compression, a first stage compression and a second stage compression; and further comprising cooling said gas comprising oxygen between compression stages.

7. The method of claim 3, wherein gaseous fuel pressure before said mixing equals a pressure of said mixture to within a predetermined range of tolerance and a pressure of said gas comprising oxygen before said mixing is less than said pressure of said mixture.

8. The method of claim 7, wherein said pressure of said gas comprising oxygen is one third of said pressure of said mixture to within a predetermined range of tolerance.

9. The method of claim 3, wherein said mixing comprises:
    introducing said gas comprising oxygen into a mixing-compressing apparatus;
    introducing said gaseous fuel into said mixing-compressing apparatus after said gas comprising oxygen; and
    compressing said mixture.

10. The method of claim 9, further comprising:
    pumping said gaseous fuel in a liquefied state; and
    vaporizing said gaseous fuel from a liquefied state to a gas state, whereby said pumping pressurizes said gaseous fuel in said gas state.

11. The method of claim 1, wherein at least one said gas comprising oxygen is air; and said gaseous fuel is at least one of natural gas, ethane, methane, propane, biogas, landfill gas, dimethyl ether, hydrogen and mixtures thereof.

12. The method of claim 1, further comprising:
pressurizing air to a first pressure;
cooling air at the first pressure; and
pressurizing the cooled air to a second pressure.

13. The method of claim 12, further comprising:
pressurizing air to a first pressure;
cooling air at the first pressure; and
pressurizing the cooled air to a second pressure; and at least one of:
wherein the step of cooling comprises circulating air at said first pressure through a heat exchanger employed to transfer heat to a cryogenic fluid; and
wherein the step of cooling comprises storing air at said first pressure in an accumulator located within a cryogenic tank.

14. The method of claim 1, further comprising at least one of:
(a) adjusting a mixture mass ratio between said gas comprising oxygen and said gaseous fuel by controlling mass flow rate of air into a mixing apparatus by adjusting a duty cycle of a control signal employed to open and close a valve through which air passes upstream of said mixing apparatus;
(b) selectively introducing said mixture into said combustion chamber as a function of engine operating conditions wherein said mixture is introduced during at least one of transient engine operating conditions and selected regions of an engine operating map;
(c) storing said mixture prior to selective introduction of said mixture into said combustion chamber.

15. The method of claim 1, wherein said mixture is selectively formed and injected into said combustion chamber as a function of engine operating conditions.

16. An apparatus for introducing a gaseous fuel into a combustion chamber of an internal combustion engine comprising:
a supply of said gaseous fuel;
a supply of a gas comprising oxygen;
a mixture forming apparatus for forming a mixture between said gas comprising oxygen and said gaseous fuel; and
an injection valve for directly introducing said mixture into said combustion chamber;
wherein a mass ratio between said gas comprising oxygen and said gaseous fuel in said mixture is less than the upper flammability limit mass ratio such that said mixture is non-ignitable.

17. The apparatus of claim 16, further comprising at least one of:
(a) wherein when said gaseous fuel comprises methane, said mixture comprises a mixture mass ratio (mass of gas comprising oxygen : mass of gaseous fuel) between 0:1 and 8.8:1;
(b) wherein when said gaseous fuel comprises methane, said mixture comprises a mixture mass ratio (mass of gas comprising oxygen : mass of gaseous fuel) between 0:1 and 2:1; and
(c) wherein when said gaseous fuel comprises methane, said mixture comprises a mixture mass ratio (mass of gas comprising oxygen : mass of gaseous fuel) between 0.25:1 and 1:1.

18. The apparatus of claim 16, wherein said mixture forming apparatus comprises a mixing apparatus for mixing said gas comprising oxygen received from said gas comprising oxygen supply and said gaseous fuel received from said gaseous fuel supply; and a compressing apparatus for compressing said mixture.

19. The apparatus of claim 16, wherein said mixture forming apparatus comprises:
a compressing apparatus for compressing said gas comprising oxygen received from said gas comprising oxygen supply;
a pumping apparatus for pumping said gaseous fuel received from said gaseous fuel supply; and
a mixing apparatus for mixing said gas comprising oxygen received from said compressing apparatus and said gaseous fuel received from said pumping apparatus.

20. The apparatus of claim 19, further comprising a pressure regulator upstream of said mixing apparatus for regulating a bias pressure between said gaseous fuel and said gas comprising oxygen.

21. The apparatus of claim 19, further comprising a fuel injector, said fuel injector comprising said mixing apparatus and said injection valve.

22. The apparatus of claim 19, further comprising:
a valve between said compressing apparatus and said mixing apparatus; and
a controller operatively programmed to generate a signal for commanding said valve to open and close such that a mass flow rate of said gas comprising oxygen through said valve is controlled;
whereby a mixture mass ratio between said gas comprising oxygen and said gaseous fuel is controlled by controlling said mass flow rate of said gas comprising oxygen through said valve.

23. The apparatus of claim 19, further comprising:
an accumulator for storing said mixture received from said mixture forming apparatus;
a valve between said accumulator and said injection valve; and
a controller operatively connected with said valve and programmed to open said valve as a function of engine operating conditions to allow said mixture therethrough to said injection valve.

24. The apparatus of claim 19, wherein said compressing apparatus comprises:
a first compressor for pressurizing said gas comprising oxygen; and
a first storage for storing said gas comprising oxygen received from said first compressor.

25. The apparatus of claim 19, wherein said compressing apparatus comprises:
a first compressor for pressurizing said gas comprising oxygen; and
a first storage for storing said gas comprising oxygen received from said first compressor;
further comprising at least one of:
(a) a power take-off from said internal combustion engine for driving said first compressor;
(b) an electric generator driven by said internal combustion engine; and
(c) an electric motor for driving said first compressor powered from electricity provided by said electric generator;
(d) a turbine driven from exhaust gases of said internal combustion engine, whereby said turbine drives said first compressor; and
(e) wherein said gas comprising oxygen is air and said first compressor comprises an engine brake of said internal combustion engine, whereby at least a portion of air compressed by said engine brake is stored in said first storage.

26. The apparatus of claim 24, further comprising:
a second compressor for compressing said gas comprising oxygen from said first storage; and
a second storage for storing said gas comprising oxygen received from said second compressor.

27. The apparatus of claim 26, further comprising:
a second compressor for compressing said gas comprising oxygen from said first storage; and
a second storage for storing said gas comprising oxygen received from said second compressor; and at least one of:
 (a) an electric generator driven by said internal combustion engine; and
 (b) an electric motor for driving said second compressor and powered from electricity provided by said electric generator; and
 (c) a power take-off from said internal combustion engine for driving said second compressor.

28. The apparatus of claim 26, wherein said first compressor comprises a cylinder and a piston of said internal combustion engine, said apparatus further comprising:
an electronic controller;
a check valve between said cylinder and said first storage operable to deliver a portion of air compressed by said piston in said cylinder during a compression stroke; and
a control valve between said second storage and said mixing apparatus and operably connected with said electronic controller;
whereby said electronic controller commands said control valve to meter a predetermined amount of said gas comprising oxygen into said mixing apparatus.

29. The apparatus of claim 28, further comprising:
a first pressure sensor for providing a first pressure signal representative of gas comprising oxygen pressure upstream of said control valve; and
a second pressure sensor for providing a second pressure signal representative of gas comprising oxygen pressure downstream from said control valve;
whereby said electronic controller receives said first and second pressure signals and commands said control valve as a function of said first and second pressure signals and gaseous fuel pressure upstream of said mixing apparatus.

30. The apparatus of claim 28, wherein said gaseous fuel pressure is determined by one of an entry in an engine map and a third pressure sensor.

31. The apparatus of claim 16, wherein at least one of said gas comprising oxygen is air; and said gaseous fuel is at least one of natural gas, ethane, methane, propane, biogas, landfill gas, dimethyl ether, hydrogen and mixtures thereof.

32. The apparatus of claim 16, wherein said mixture forming apparatus comprises:
a first compressing apparatus for compressing said gas comprising oxygen received from said gas comprising oxygen supply to a first pressure;
an accumulator for storing said gas comprising oxygen at said first pressure located within a cryogenic tank; and
a second compressing apparatus for compressing said gas comprising oxygen received from said accumulator to a second pressure;
whereby a temperature of said gas comprising oxygen received from said first compressing apparatus is reduced in said accumulator due to heat leak from said accumulator to said cryogenic tank thereby improving efficiency of compressing said gas comprising oxygen to said second pressure.

* * * * *